(12) United States Patent
Das et al.

(10) Patent No.: US 9,001,679 B2
(45) Date of Patent: Apr. 7, 2015

(54) SUPPORTING VOICE FOR FLEXIBLE BANDWIDTH SYSTEMS

(75) Inventors: Soumya Das, San Diego, CA (US); Ozgur Dural, San Diego, CA (US); Edwin C. Park, San Diego, CA (US); Bongyong Song, San Diego, CA (US); Samir Salib Soliman, San Diego, CA (US); Yuheng Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 13/491,510

(22) Filed: Jun. 7, 2012

(65) Prior Publication Data

US 2013/0148520 A1    Jun. 13, 2013

Related U.S. Application Data

(60) Provisional application No. 61/556,777, filed on Nov. 7, 2011, provisional application No. 61/568,742, filed on Dec. 9, 2011, provisional application No. 61/621,151, filed on Apr. 6, 2012.

(51) Int. Cl.
*H04J 13/10* (2011.01)
*H04W 74/00* (2009.01)
(Continued)

(52) U.S. Cl.
CPC ............ *H04J 13/0077* (2013.01); *H04W 72/00* (2013.01); *G10L 19/16* (2013.01); *H04W 52/12* (2013.01); *H04W 52/20* (2013.01)

(58) Field of Classification Search
None
See application file for complete search history.

(56) References Cited

U.S. PATENT DOCUMENTS 6,236,647 B1    5/2001   Amalfitano
6,829,227 B1 *  12/2004  Pitt et al. .................. 370/329
(Continued)

FOREIGN PATENT DOCUMENTS

EP    1213868 A1    6/2002
EP    2317816 A1    5/2011
(Continued)

OTHER PUBLICATIONS

3GPP, 3GPP TR 36.806 V9.0.0, 3rd Generation Partnership Project; Technical Specification Group Radio Access Network; Evolved Universal Terrestrial Radio Access (E-UTRA); Relay architectures for E-UTRA (LTE-Advanced) (Release 9), Mar. 2010, pp. 1-34.*
(Continued)

*Primary Examiner* — Omar Ghowrwal
(74) *Attorney, Agent, or Firm* — Jeffrey D. Jacobs

(57) ABSTRACT

Methods, systems, and devices for supporting voice communications in a wireless communications system are provided. Some embodiments utilize multiple code channels to transmit the voice frames. These embodiments include parallel multi-code embodiments, offset multi-code embodiments, and multi-user multi-code embodiments. Some embodiments utilize flexible carrier bandwidths systems that may utilize portions of spectrum that may not be big enough to fit a normal bandwidth waveform. Some embodiments transmit and receive a subset of subframes of voice frames received over flexible bandwidth code channels. In some embodiments, a subset of subframes based on a flexible bandwidth scaling factor of one or more flexible bandwidth code channels is transmitted. The receiver may decode the voice frame based on the received subset of subframes. An outer loop power control set-point may be adjusted to provide a predetermined frame error rate based on the number of transmitted subframes.

18 Claims, 23 Drawing Sheets

(51) Int. Cl.
*H04W 28/02* (2009.01)
*H04L 12/801* (2013.01)
*H04J 13/00* (2011.01)
*H04W 72/00* (2009.01)
*G10L 19/16* (2013.01)
*H04W 52/12* (2009.01)
*H04W 52/20* (2009.01)

(56) References Cited

U.S. PATENT DOCUMENTS

| | | | |
|---|---|---|---|
| 7,010,300 | B1 | 3/2006 | Jones et al. |
| 7,069,035 | B2 | 6/2006 | Chen et al. |
| 7,123,710 | B2 | 10/2006 | Ravishankar |
| 7,123,910 | B2 | 10/2006 | Lucidarme et al. |
| 7,145,876 | B2 | 12/2006 | Huang et al. |
| 7,193,982 | B2 | 3/2007 | Frerking et al. |
| 7,263,365 | B2 | 8/2007 | Rudowicz et al. |
| 7,324,553 | B1 | 1/2008 | Varier et al. |
| 7,796,632 | B2 | 9/2010 | Hasty et al. |
| 7,865,359 | B2 | 1/2011 | Chang |
| 7,898,947 | B2 | 3/2011 | Briscoe et al. |
| 8,054,893 | B2 | 11/2011 | Mizusawa |
| 8,085,713 | B2 | 12/2011 | Kang |
| 8,085,731 | B2 | 12/2011 | Zhao et al. |
| 8,547,840 | B1 | 10/2013 | Kumar et al. |
| 2001/0012271 | A1 | 8/2001 | Berger |
| 2002/0110101 | A1 | 8/2002 | Gopalakrishnan et al. |
| 2002/0159501 | A1 | 10/2002 | Agami et al. |
| 2003/0224730 | A1 | 12/2003 | Muszynski et al. |
| 2006/0171424 | A1 | 8/2006 | Choi |
| 2006/0291429 | A1 | 12/2006 | Matusz |
| 2007/0049307 | A1 | 3/2007 | Mueckenheim et al. |
| 2008/0026752 | A1 | 1/2008 | Flore et al. |
| 2008/0144612 | A1 | 6/2008 | Honkasalo et al. |
| 2008/0298442 | A1* | 12/2008 | Deng et al. ............... 375/219 |
| 2009/0094650 | A1* | 4/2009 | Carmichael ............... 725/92 |
| 2009/0141689 | A1 | 6/2009 | Parekh et al. |
| 2009/0258671 | A1 | 10/2009 | Kekki et al. |
| 2010/0246480 | A1 | 9/2010 | Aggarwal et al. |
| 2010/0255849 | A1 | 10/2010 | Ore |
| 2010/0260105 | A1 | 10/2010 | Keller et al. |
| 2010/0279691 | A1 | 11/2010 | Dwyer et al. |
| 2010/0303039 | A1 | 12/2010 | Zhang et al. |
| 2011/0013550 | A1 | 1/2011 | Wu |
| 2011/0013578 | A1 | 1/2011 | Shimizu et al. |
| 2011/0019556 | A1* | 1/2011 | Hsin et al. ............... 370/252 |
| 2011/0021216 | A1 | 1/2011 | Pudney et al. |
| 2011/0103243 | A1 | 5/2011 | Larsson et al. |
| 2011/0134831 | A1 | 6/2011 | Pirskanen |
| 2011/0205976 | A1 | 8/2011 | Roessel et al. |
| 2011/0217980 | A1 | 9/2011 | Faurie et al. |
| 2011/0244870 | A1 | 10/2011 | Lee |
| 2011/0267978 | A1 | 11/2011 | Etemad |
| 2011/0268045 | A1 | 11/2011 | Heo et al. |
| 2011/0269453 | A1 | 11/2011 | Ranta-Aho et al. |
| 2011/0276701 | A1 | 11/2011 | Purnadi et al. |
| 2011/0310835 | A1 | 12/2011 | Cho et al. |
| 2012/0015656 | A1 | 1/2012 | Tiwari |
| 2012/0063421 | A1 | 3/2012 | Wu |
| 2012/0102162 | A1 | 4/2012 | Devireddy |
| 2012/0113982 | A1 | 5/2012 | Akselin et al. |
| 2012/0120789 | A1 | 5/2012 | Ramachandran et al. |
| 2012/0140743 | A1 | 6/2012 | Pelletier et al. |
| 2012/0142367 | A1 | 6/2012 | Przybylski |
| 2012/0149377 | A1 | 6/2012 | Su et al. |
| 2012/0163249 | A1 | 6/2012 | Chin et al. |
| 2012/0165019 | A1 | 6/2012 | Shintani et al. |
| 2012/0195209 | A1 | 8/2012 | Jain et al. |
| 2013/0017805 | A1 | 1/2013 | Andre-Joensson et al. |
| 2013/0044613 | A1 | 2/2013 | Edara et al. |
| 2013/0084870 | A1 | 4/2013 | Nylander et al. |
| 2013/0114415 | A1 | 5/2013 | Das et al. |
| 2013/0114433 | A1 | 5/2013 | Park et al. |
| 2013/0114436 | A1 | 5/2013 | Dural et al. |
| 2013/0114473 | A1 | 5/2013 | Awoniyi et al. |
| 2013/0114566 | A1 | 5/2013 | Awoniyi et al. |
| 2013/0114571 | A1 | 5/2013 | Das et al. |
| 2013/0115967 | A1 | 5/2013 | Soliman et al. |
| 2013/0115991 | A1 | 5/2013 | Awoniyi et al. |
| 2013/0115994 | A1 | 5/2013 | Awoniyi et al. |
| 2013/0121265 | A1 | 5/2013 | Awoniyi et al. |
| 2013/0122921 | A1 | 5/2013 | Juppi et al. |
| 2013/0148527 | A1 | 6/2013 | Awiniyi et al. |
| 2013/0148576 | A1 | 6/2013 | Huang et al. |
| 2013/0148579 | A1 | 6/2013 | Das et al. |
| 2013/0148627 | A1 | 6/2013 | Das et al. |
| 2013/0148628 | A1 | 6/2013 | Das et al. |
| 2013/0148629 | A1 | 6/2013 | Das et al. |
| 2013/0150045 | A1 | 6/2013 | Das et al. |
| 2013/0176952 | A1 | 7/2013 | Shin et al. |
| 2013/0182655 | A1 | 7/2013 | Das et al. |
| 2014/0010170 | A1 | 1/2014 | Das et al. |

FOREIGN PATENT DOCUMENTS

| | | |
|---|---|---|
| EP | 2385653 A2 | 11/2011 |
| GB | 2421880 A | 7/2006 |
| WO | 2007024748 A2 | 3/2007 |

OTHER PUBLICATIONS

Understanding CS Fallback in LTE, LteWorld, Sep. 27, 2009. http://lteworld.org/blog/understanding-cs-fallback-lte[accessed on Oct. 30, 2014 11:24:28 AM]. pp. 1-3.*

Marks, The IEEE 802.16 Wireless MAN Standard for Broadband Wireless Metropolitan Area Networks, Apr. 16, 2003, pp. 1-57.*

IEEE, IEEE Standard for Information technology—Telecommunications and information exchange between systems-Local and metropolitan area networks—Specific requirements Part 11: Wireless LAN Medium Access Control (MAC) and Physical Layer (PHY) Specifications, 2007, pp. 1-98.*

Mark Klerer, Introduction to IEEE 802.20, Mar. 10, 2003, pp. 1-44.*

Arjona et al., Live Netowrk Performance Challenge FLASH-OFDM vs. HSDPA, 2008, pp. 1-8.*

Co-pending U.S. Appl. No. 13/707,111, filed Dec. 6, 2012.

Co-Pending U.S. Appl. No. 14/091,933, filed Nov. 27, 2013.

3GPP TS 23.009 V11.0.0 (Sep. 2011), 3rd Generation Partnership Project; Technical Specification Group Core Network and Terminals; Handover procedures (Release 11).

3GPP TS 25.213 "3rd Generation Partnership Project; Technical Specification Group Radio Access Network; Spreading and modulation," version 9.2.0, release 9, Sep. 2010.

3GPP TS 25.331 v11.0.0 (Dec. 2011), 3rd Generation Partnership Project; Technical Specification Group Radio Access Network; Radio Resource Control (RRC); Protocol specification (Release 11).

3GPP TS 25.413 V10.5.0 (Mar. 2012), 3rd Generation Partnership Project; Technical Specification Group Radio Access Network; UTRAN Iu interface, Radio Access Network Application Part (RANAP) signalling (Release 10).

3GPP TS 34.108 V9.6.0 (Sep. 2011), 3rd Generation Partnership Project; Technical Specification Group Radio Access Network; Common test environments for User Equipment (UE); Conformance testing (Release 9).

"3rd Generation Partnership Project; Technical Specification Group Services and System Aspects; Circuit Switched (CS) fallback, in Evolved Packet System (EPS); Stage 2 (Release 10)", 3GPP Standard; 3GPP TS 23.272, 3rd Generation Partnership Project (3GPP), Mobile Competence Center ; 650, Route des Lucioles ; F-06921 Sophiaantipolis Cedex ; France, vol. SA WG2, No. V10.5.0, Aug. 24, 2011, pp. 1-79, XP050553745, [retrieved on Aug. 24, 2011].

"3rd Generation Partnership Project; Technical Specification Group Services and System Aspects; Single Radio Voice Call Continuity (SRVCC); Stage 2 (Release 11)", 3GPP Standard; 3GPP TS 23.216, 3rd Generation Partnership Project (3GPP), Mobile Competence Centre ; 650, Route des Lucioles ; F-06921 Sophiaantipolis Cedex ; France, vol. SA WG2; No. V11.2.0, Aug. 24, 2011, pp. 1-53, XP050553738, [retreieved on Aug. 24, 2011].

(56) References Cited

OTHER PUBLICATIONS

Abeta S., "Toward LTE commercial launch and future plan for LTE enhancements (LTE-Advanced)", Communication Systems (ICCS), 2010 IEEE International Conference on, IEEE, Piscataway, NJ, USA, Nov. 17, 2010, pp. 146-150, XP031848276, ISBN: 978-1-4244-7004-4.

Ericsson: "LTE Spurious emission concept for flexible bandwidth", 3GPP Draft; R4-051130, 3rd Generation Partnership Project (3GPP), Mobile Competence Centre, 650, Route des Lucioles; F-06921 Sophia-Antipolis Cedex; France, vol. RAN WG4, No. Seoul, Korea; 20051103, Nov. 3, 2005, XP050174721.

Gessner C., et al., "Voice and SMS in LTE White Paper," Rhode & Schwartz GmbH & Co. KG, 2011, <URL: http://www2.rhode-schwarz.com/file_15903/1MA197_1e.pdf> pp. 1-45.

Holma, H., et al., "WCDMA for UMTS—HSPA Evolution and LTE (4th Edition)" In: "WCDMA for UMTS—HSPA Evolution and LTE (4th Edition)", Jan. 1, 2007, John Wiley & Sons Ltd., UK, XP055052236, ISBN: 978-0-47-031933-8, pp. 74-75.

International Search Report and Written Opinion—PCT/US2012/063895—ISA/EPO—May 13, 2003.

International Search Report and Written Opinion—PCT/US2012/063903—ISA/EPO—Mar. 22, 2013.

Qunhui C., "Evolution and deployment of VoLTE", Huawei Communicate, Sep. 1, 2011, XP055052291, p. 52-55.

Samsung: "FDD/TDD dual mode UE capability handling", 3GPP Draft; 36331_CRXXXX_(REL-10)_R2-116035 FDD TDD Dual Mode UE, 3rd Generation Partnership Project (3GPP), Mobile Competence Centre; 650, Route des Lucioles; F-06921 Sophia-Antipolis Cedex; France, vol. RAN WG2, No. San Francisco, USA; 20111114-20111119, Nov. 7, 2011, XP050564131, [retrieved on Nov. 7, 2011].

"Understanding CS Fallback in LTE", Sep. 27, 2009, XP055052327.

ZTE: "Discussion on activation and deactivation", 3GPP Draft; R2-103719, 3rd Generation Partnership Project (3GPP), Mobile Competence Centre; 650, Route Des Lucioles; F-06921 Sophia-Antipolis Cedex; France, vol. RAN WG2, No. Stockholm, Sweden; 20100628, Jun. 22, 2010, XP050451195, [retrieved on Jun. 22, 2010].

Black, et al., "Interference Cancellation Techniques for CDMA2000 1x Reverse Link", IEEE Globecom 2009, Global Telecommuncations Conference, 2009, 5 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall 6 description; Stage 2 (Release 10) ", 3GPP Standard; 3GPP TS 36.300, 3rd Generation Partnership D Project (3GPP), Mobile Competence Centre; 650, Route des Lucioles ; F-06921 Sophiaantipolis Cedex; France, vol. Ran WG2, No. V10.5.0, Sep. 28, 2011, pp. 1-194.

* cited by examiner

SUPPORTING VOICE FOR FLEXIBLE BANDWIDTH SYSTEMS

CROSS-RELATED APPLICATIONS

Techniques described herein may be used for various wireless communications systems such as CDMA, TDMA, FDMA, OFDMA, SC-FDMA, Peer-to-Peer, and other systems. The terms "system" and "network" are often used interchangeably. The techniques described herein may be used for the systems and radio technologies mentioned above as well as other systems and radio technologies.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

Service providers are typically allocated blocks of frequency spectrum for exclusive use in certain geographic regions. These blocks of frequencies are generally assigned by regulators regardless of the multiple access technology being used. In most cases, these blocks are not integer multiple of channel bandwidths, hence there may be unutilized parts of the spectrum. As the use of wireless devices has increased, the demand for and value of this spectrum has generally surged, as well. Nonetheless, in some cases, wireless communications systems may not utilize portions of the allocated spectrum because the portions are not big enough to fit a standard or normal waveform. The developers of the LTE standard, for example, recognized the problem and decided to support 6 different system bandwidths, namely 1.4, 3, 5, 10, 15 and 20 MHz. This may provide one partial solution to the problem. In addition, some types of communications are delay sensitive and may require at least a certain data rate and/or a certain quality of service without retransmission of lost data. For these types of communications, certain system bandwidths may result in lower than acceptable quality of service or inefficient use of bandwidth.

SUMMARY

Embodiments include methods, systems, and devices for supporting voice in wireless communications systems. Some embodiments utilize multiple code channels to transmit voice frames. These embodiments may include regular slot boundary embodiments, offset multi-code embodiments, parallel multi-code embodiments, and/or multi-user multi-code embodiments. These embodiments may utilize flexible or normal bandwidth systems. For example, a flexible bandwidth communications system may employ code channels where a scaling factor is applied to a chip rate or symbol rate that dilates the symbol rate of the code channel. In some embodiments, the number of code channels is greater than the scaling factor of the flexible bandwidth code channels.

Some embodiments transmit and receive a subset of subframes of voice frames over one or more flexible bandwidth code channels. In some embodiments, a subset of subframes of voice frames are transmitted over the one or more flexible bandwidth code channels. The number of subframes in the subset of subframes may be based on the scaling factor of the one or more flexible bandwidth code channels. The subset of subframes may be time-dilated by the flexible bandwidth waveform to occupy substantially all of a voice frame duration of a normal system transmitting all subframes of the voice frame. The receiver may attempt decode of the voice frames based on the received subset of subframes of the voice frames. An outer loop power control set-point may be adjusted to provide a predetermined frame error rate based on the subset of subframes. The subframes may include power control groups (PCGs) or slots, for example.

Some embodiments include a method for supporting voice over a wireless communications system. The method may include determining a plurality of code channels, generating a plurality of voice frames for transmission, and/or transmitting the plurality of voice frames over the plurality of code channels. The method may include utilizing an offset between the plurality of code channels when transmitting the plurality of voice frames over the plurality of code channels. The method may include splitting one or more of the plurality of voice frames into a plurality of voice subframes. Transmitting the plurality of voice frames over the plurality of code channels may include transmitting the plurality of voice subframes for at least one of the plurality of voice frames over the plurality of code channels without an offset between the plurality of voice subframes. Transmitting the plurality of voice frames over the plurality of code channels may include transmitting a plurality of voice subframes from a plurality of users over the plurality of code channels. In some embodiments, delay in transmission for the plurality of voice subframes is less than a delay in transmission for a normal bandwidth system. The plurality of code channels may be configured as a logical traffic channel for voice transmission via a circuit-switched network.

In some embodiments, the wireless communications system is a flexible bandwidth system and the plurality of code channels depends on a scaling factor of the flexible bandwidth system. An offset may be utilized between the plurality of code channels when transmitting the plurality of voice frames over the plurality of code channels. The plurality of code channels may be greater than the scaling factor of the flexible bandwidth system. The method may include determining a termination target based on the scaling factor of the flexible bandwidth system and/or transmitting a subset of the subframes of the voice frames over the plurality of code channels based on the termination target. The termination target may be less than the number of subframes in the voice frames.

In some embodiments, a method for supporting voice over a wireless communications system includes encoding an input speech vector into a plurality of encoded voice frames, each encoded voice frame having a plurality of subframes, determining a termination target based on a flexible bandwidth scaling factor of one or more code channels of the wireless communications system, and/or transmitting a subset of the subframes of the encoded voice frames over the one or more code channels, the subset of the subframes of the encoded voice frames based on the termination target. The termination target may be less than a number of subframes in the encoded voice frames. The method may include adjusting an outer loop power control set point of the one or more code channels based on the termination target and a frame error rate. The frame error rate may be based on a predetermined voice quality metric. The method may include scaling a chip rate for the one or more code channels by the flexible bandwidth scaling factor. The one or more code channels may be configured as a logical traffic channel for voice transmission via a circuit-switched network. The subframes may include PCGs or slots, for example.

In some embodiments, the wireless communications system includes a plurality of code channels, and transmitting the subset of subframes over the plurality of code channels includes transmitting a first plurality of the subset of subframes of the encoded voice frames over a first code channel and/or transmitting a second plurality of the subset of subframes of the encoded voice frames over a second code channel.

In some embodiments, a method for supporting voice over a wireless communications system includes determining a termination target for one or more code channels of the wireless communications system based on a flexible bandwidth scaling factor, receiving a subset of a plurality of subframes of a voice frame over the one or more code channels based on the termination target for the one or more code channels, and/or decoding the voice frame based on the subset of the plurality of subframes. The termination target may be less than the number of subframes in an encoded traffic channel frame. The method may include determining a measured frame error rate based on the decoding, and/or determining an adjustment to an outer loop power control set point for the one or more code channels based on the termination target and the measured frame error rate. The adjustment of the outer loop power control set point may be based on the measured frame error rate and a predetermined frame error rate. The one or more code channels may be configured as a logical traffic channel for voice transmission via a circuit-switched network. The one or more code channels may include a fundamental code channel and/or one or more supplemental code channels. The subframes may include PCGs or slots, for example.

In some embodiments, the wireless communications system includes a plurality of code channels and the receiving the subset of the plurality of subframes includes receiving a first plurality of the subset of subframes over a first code channel of the plurality of code channels and/or receiving a second plurality of the subset of subframes over a second code channel of the plurality of code channels.

The previous methods may also be implemented in some embodiments by a wireless communications system configured for supporting voice, a wireless communications device configured for supporting voice, and/or a computer program product for supporting voice within a wireless communications system that includes a non-transitory computer-readable medium.

Some embodiments include a wireless communications system for supporting voice. The system may include means for determining a plurality of code channels, means for generating a plurality of voice frames for transmission, and/or means for transmitting the plurality of voice frames over the plurality of code channels. The wireless communications system may include means for utilizing an offset between the plurality of code channels when transmitting the plurality of voice frames over the plurality of code channels. In some embodiments, the wireless communications system includes means for splitting one or more of the plurality of voice frames into a plurality of voice subframes. The means for transmitting the plurality of voice frames over the plurality of code channels may include means for transmitting subframes for at least one of the plurality of voice frames over the plurality of code channels without an offset between the plurality of voice subframes.

In some embodiments, the wireless communications system is a flexible bandwidth system and the plurality of code channels depends on a scaling factor of the flexible bandwidth system. The plurality of code channels may be greater than the scaling factor of the flexible bandwidth system.

In some embodiments, the wireless communications system for supporting voice includes means for encoding an input speech vector into a plurality of encoded voice frames, each encoded voice frame having a plurality of subframes, means for determining a termination target based on a flexible bandwidth scaling factor of one or more code channels of the wireless communications system, the termination target less than a number of subframes in the encoded voice frames, and/or means for transmitting a subset of the subframes of the encoded voice frames over the one or more code channels, the subset of the subframes of the encoded voice frames based on the termination target. In some embodiments, the wireless communications system includes means for adjusting an outer loop power control set point of the one or more code channels based on the termination target and a frame error rate. The frame error rate may be based on a predetermined voice quality metric. The subframes may include PCGs or slots, for example.

In some embodiments, the wireless communications system for supporting voice includes means for determining a termination target for one or more code channels of the wireless communications system based on a flexible bandwidth scaling factor, the termination target less than a number of subframes in an encoded traffic channel frame, means for receiving a subset of a plurality of subframes of a voice frame over the one or more code channels, wherein the subset of the plurality of subframes is based on the termination target for the one or more code channels, and/or means for decoding the voice frame based on the subset of the plurality of subframes. The wireless communications system may include means for determining a measured frame error rate based on the decoding and/or means for determining an adjustment to an outer loop power control set point for the one or more code channels based on the termination target and the measured frame error rate. The adjustment of the outer loop power control set point may be based on the measured frame error rate and a predetermined frame error rate.

Some embodiments include a computer program product for supporting voice in a wireless communications system. The computer program product may include a non-transitory computer-readable medium that includes code for determining a plurality of code channels, code for generating a plurality of voice frames for transmission, and/or code for transmitting the plurality of voice frames over the plurality of code channels. The wireless communications system may be a flexible bandwidth system and/or the plurality of code channels may depend on a scaling factor of the flexible bandwidth system. The code for transmitting the plurality of voice frames over the plurality of code channels may include code for transmitting a plurality of voice subframes from a plurality of users over the plurality of code channels. In some embodiments, delay in transmission for the plurality of voice subframes is less than a delay in transmission for a normal bandwidth system.

The non-transitory computer-readable medium may include code for determining a termination target based on the scaling factor of the flexible bandwidth system, the termination target less than a number of subframes in the voice frames and/or code for transmitting a subset of the subframes of the voice frames over the plurality of code channels, the subset of the subframes of the voice frames based on the termination target. The subframes may include PCGs or slots, for example.

In some embodiments, the computer program product includes a non-transitory computer-readable medium including code for encoding an input speech vector into a plurality of encoded voice frames, each encoded voice frame having a plurality of subframes, code for determining a termination target based on a flexible bandwidth scaling factor of one or more code channels of the wireless communications system, the termination target less than a number of subframes in the encoded voice frames, and/or code for transmitting a subset of the subframes of the encoded voice frames over the one or more code channels, the subset of the subframes of the encoded voice frames based on the termination target. The code for transmitting a subset of the subframes of the encoded voice frames over the one or more code channels may include code for scaling a chip rate for the one or more code channels by the flexible bandwidth scaling factor.

In some embodiments, the wireless communications system includes a plurality of code channels. The code for transmitting the subset of the subframes over the plurality of code channels may include code for transmitting a first plurality of the subset of subframes of the encoded voice frames over a first code channel and/or code for transmitting a second plurality of the subset of subframes of the encoded voice frames over a second code channel.

In some embodiments, the computer program product includes a non-transitory computer-readable medium including code for determining a termination target for one or more code channels of the wireless communications system based on a flexible bandwidth scaling factor, the termination target less than a number of subframes in an encoded traffic channel frame, code for receiving a subset of a plurality of subframes of a voice frame over the one or more code channels, wherein the subset of the plurality of subframes is based on the termination target for the one or more code channels, and/or code for decoding the voice frame based on the subset of the plurality of subframes. The code for receiving the subset of the plurality of subframes over the one or more code channels may include code for scaling a chip rate for the one or more code channels by the flexible bandwidth scaling factor. The subframes may include PCGs or slots, for example.

In some embodiments, the wireless communications system includes a plurality of code channels. The code for receiving the subset of the plurality of subframes of a voice frame over the plurality of code channels may include code for receiving a first plurality of the subset of subframes over a first code channel of the plurality of code channels and/or code for receiving a second plurality of the subset of subframes over a second code channel of the plurality of code channels.

Some embodiments include a wireless communications device configured for supporting voice in a wireless communications system. The wireless communications device may include at least one processor configured to determine a plurality of code channels, generate a plurality of voice frames for transmission, and/or transmit the plurality of voice frames over the plurality of code channels. The wireless communications device may include at least one memory coupled with the at least one processor. The at least one processor may be configured to utilize an offset between the plurality of code channels when transmitting the plurality of voice frames over the plurality of code channels. The at least one processor may be configured to split one or more of the plurality of voice frames into a plurality of voice subframes and/or transmit the plurality of voice subframes for at least one of the plurality of voice frames over the plurality of code channels without an offset between the plurality of voice subframes. The plurality of code channels may be configured as a logical traffic channel for voice transmission via a circuit-switched network.

In some embodiments, the wireless communications device includes at least one processor configured to encode an input speech vector into a plurality of encoded voice frames, each encoded voice frame having a plurality of subframes, determine a termination target based on a flexible bandwidth scaling factor of one or more code channels of the wireless communications system, the termination target less than a number of subframes in the encoded voice frames, and/or transmit a subset of the subframes of the encoded voice frames over the one or more code channels, the subset of the subframes of the encoded voice frames based on the termination target. The at least one processor may be configured to adjust an outer loop power control set point of the one or more code channels based on the termination target and a frame error rate. The frame error rate may be based on a predetermined voice quality metric. The one or more code channels may be configured as a logical traffic channel for voice transmission via a circuit-switched network. The subframes may include PCGs or slots, for example.

In some embodiments, the wireless communications device includes at least one processor configured to determine a termination target for one or more code channels of the wireless communications system based on a flexible bandwidth scaling factor, the termination target less than a number of subframes in an encoded traffic channel frame, receive a subset of a plurality of subframes of a voice frame over the one or more code channels, wherein the subset of the plurality of subframes is based on the termination target for the one or more code channels, and decode the voice frame based on the subset of the plurality of subframes. The at least one processor may be configured to determine a measured frame error rate based on received voice frames, and determine an adjustment for an outer loop power control set point of the one or more code channels based on the termination target and the measured frame error rate. The adjustment for the outer loop power control set point of the one or more code channels may be based on the measured frame error rate and a predetermined frame error rate. The one or more code channels may be configured as a logical traffic channel for voice transmission via a circuit-switched network.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
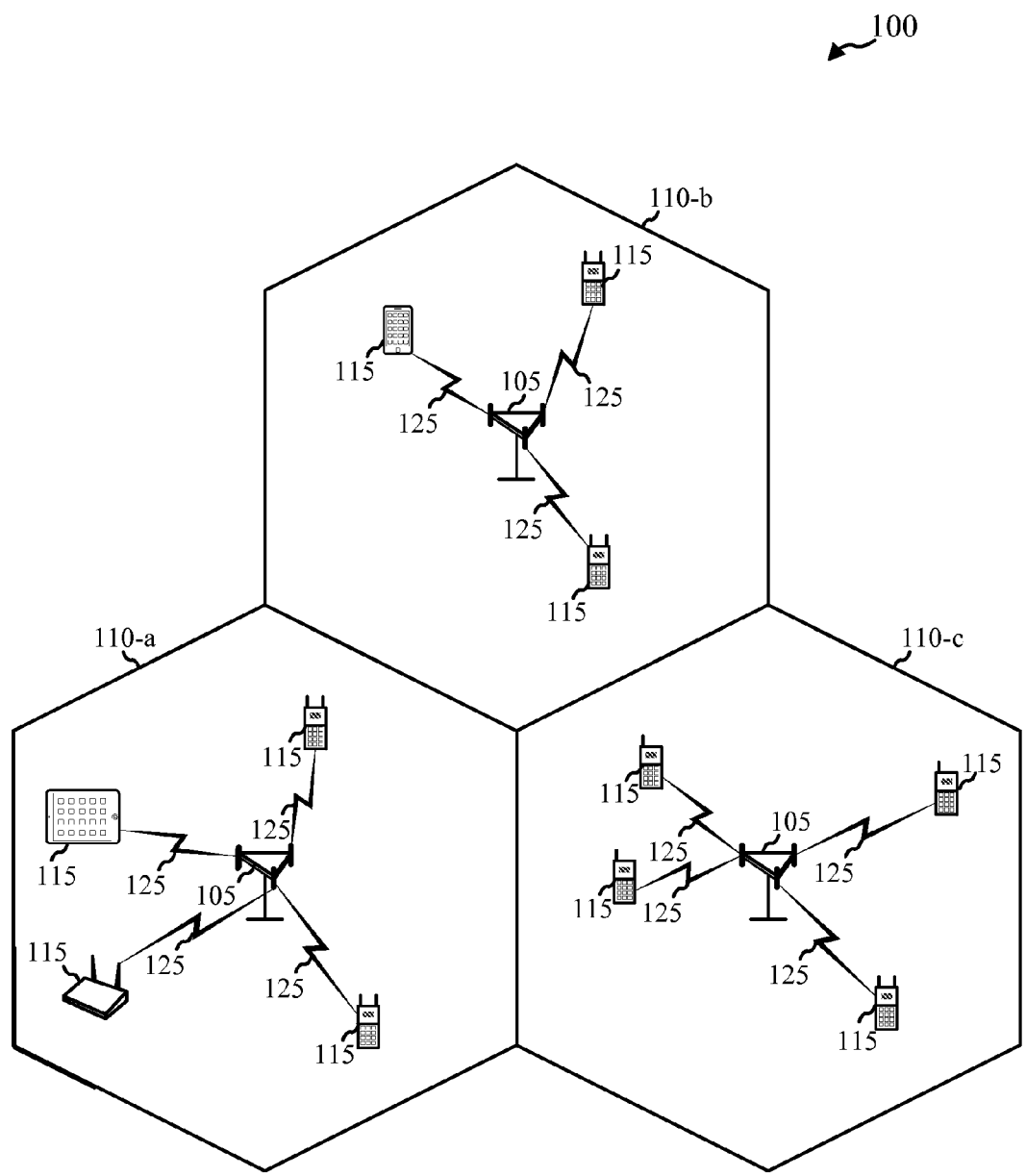
FIG. 1 shows a block diagram of a wireless communications system in accordance with various embodiments.
Figure 1:
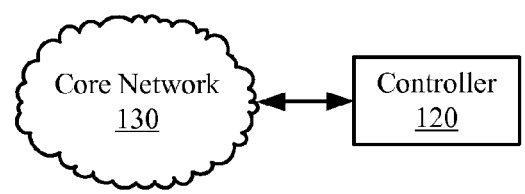

Methods, systems, and devices are described for supporting voice in wireless communications systems. Some embodiments utilize multiple code channels to transmit voice frames. These embodiments may include regular frame boundary embodiments, offset multi-code embodiments, parallel multi-code embodiments, and/or multi-user multi-code embodiments. Such multi-code embodiments may utilize flexible or normal bandwidth systems. For example, a flexible bandwidth communications system may employ code channels where a scaling factor is applied to a chip rate or symbol rate that dilates the symbol rate of the code channel. In some embodiments, the number of code channels may be greater than the scaling factor of the flexible bandwidth code channels.

Some embodiments transmit a subset of subframes of voice frames over one or more flexible bandwidth code channels. The number of transmitted subframes may be based on the scaling factor of the one or more flexible bandwidth code channels. The subset of subframes may be time-dilated by the flexible bandwidth waveform to occupy substantially all of the time period of a voice frame of a normal system. The receiver may attempt decode of the voice frames based on the received subset of subframes of the voice frames. An outer loop power control set-point may be adjusted to provide a predetermined frame error rate (FER) based on the subset of subframes. Inner loop power control may be used to adjust transmit power for each subframe based on channel quality feedback and the predetermined FER. In some embodiments, transmission of a subset of subframes of voice frames may be applied in combination with multi-code techniques in various ways for supporting voice communications. The subframes may include power control groups (PCGs) or slots, for example.

Techniques described herein may be used for various wireless communications systems such as CDMA, TDMA, FDMA, OFDMA, SC-FDMA, Peer-to-Peer, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA or OFDM system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100 in accordance with various embodiments. The system 100 includes base stations 105, mobile devices 115, a base station controller 120, and a core network 130 (the controller 120 may be integrated into the core network 130 in some embodiments; in some embodiments, controller 120 may be integrated into base stations 105). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, Time Division Multiple Access (TDMA) signal, Frequency Division Multiple Access (FDMA) signal, Orthogonal FDMA (OFDMA) signal, Single-Carrier FDMA (SC-FDMA) signal, etc. Each modulated signal may be sent on a different carrier and may carry control information (e.g., pilot signals), overhead information, data, etc. The system 100 may be a multi-carrier LTE network capable of efficiently allocating network resources.

The mobile devices 115 may be any type of mobile station, mobile device, access terminal, subscriber unit, or user equipment. The mobile devices 115 may include cellular phones and wireless communications devices, but may also include personal digital assistants (PDAs), smartphones, other handheld devices, netbooks, notebook computers, etc. Thus, the term mobile device should be interpreted broadly hereinafter, including the claims, to include any type of wireless or mobile communications device.

The base stations 105 may wirelessly communicate with the mobile devices 115 via a base station antenna. The base stations 105 may be configured to communicate with the mobile devices 115 under the control of the controller 120 via multiple carriers. Each of the base station 105 sites can provide communication coverage for a respective geographic area. In some embodiments, base stations 105 may be referred to as a NodeB, eNodeB, Home NodeB, and/or Home eNodeB. The coverage area for each base station 105 here is identified as 110-a, 110-b, or 110-c. The coverage area for a base station may be divided into sectors (not shown, but making up only a portion of the coverage area). The system 100 may include base stations 105 of different types (e.g., macro, micro, femto, and/or pico base stations).

The different aspects of system 100, such as the mobile devices 115, the base stations 105, the core network 130, and/or the controller 120 may be configured to utilize flexible bandwidth and waveforms in accordance with various embodiments. System 100, for example, shows transmissions 125 between mobile devices 115 and base stations 105. The transmissions 125 may include uplink and/or reverse link transmission, from a mobile device 115 to a base station 105, and/or downlink and/or forward link transmissions, from a base station 105 to a mobile device 115. The transmissions 125 may include flexible and/or normal waveforms. Normal waveforms may also be referred to as legacy and/or normal waveforms.

The different aspects of system 100, such as the mobile devices 115, the base stations 105, the core network 130, and/or the controller 120 may be configured to utilize flexible bandwidth and waveforms in accordance with various embodiments. For example, different aspects of system 100 may utilize portions of spectrum that may not be big enough to fit a normal waveform. Devices such as the mobile devices 115, the base stations 105, the core network 130, and/or the controller 120 may be configured to adapt the chip rates and/or scaling factors to generate and/or utilize flexible bandwidth and/or waveforms. Some aspects of system 100 may form a flexible subsystem (such as certain mobile devices 115 and/or base stations 105) that may be generated with respect to a normal subsystem (that may be implemented using other mobile devices 115 and/or base stations 105) through dilating, or scaling down, the time of the flexible subsystem with respect to the time of the normal subsystem.

In some embodiments, the different aspects of system 100, such as the mobile devices 115, the base stations 105, the core network 130, and/or the controller 120 may be configured for supporting voice communications using multiple code channels and/or transmission of a subset of subframes. These techniques, described in more detail below, may be used to support voice communication between base stations 105 and mobile devices 115. Such voice communications may utilize normal bandwidth waveforms and/or flexible bandwidth waveforms. For example, a mobile device 115 and/or base station 105 may establish multiple code channels, generate voice frames, and transmit the voice frames over the multiple code channels as part of transmission 125. A mobile device 115 and/or base station 105 may be configured to receive the transmission 125 including receiving information transmitted over the multiple code channels and decoding the voice frames.

A mobile device 115 and/or base station 105 may be configured to support voice communication by transmitting a subset of voice subframes over a transmission 125. In some embodiments, mobile device 115 and/or base station 105 may determine a termination target based on a scaling factor of one or more code channels that employ flexible bandwidth waveforms. For example, the termination target may define a number of subframes to be transmitted over the one or more code channels within a period of time corresponding to a voice frame of a normal system. The mobile device 115 and/or base station 105 may transmit a subset of subframes based on the termination target over the one or more code channels. A receiving mobile device 115 and/or base station 105 may receive the subset of subframes of the voice frame and attempt decode of the voice frame based on the subset of the subframes. Outer loop power control may be adjusted of the one or more code channels to provide a predetermined frame error rate at the termination target. The subframes may include PCGs or slots, for example.

Some embodiments may include mobile devices and/or base stations that may generate flexible waveforms and/or normal waveforms. Flexible waveforms may occupy less bandwidth than a normal waveform. For example, at a band edge, there may not be enough available spectrum to place a normal waveform. For a flexible waveform in some embodiments, as time gets dilated, the frequency occupied by a waveform goes down, thus making it possible to fit a flexible waveform into spectrum that may not be broad enough to fit a normal waveform. Flexible waveforms may also be generated in some embodiments through using a scaling factor. Other embodiments may generate a flexible waveform to fit a portion of spectrum through altering a rate or chip rate (e.g., a spreading factor may change). Some embodiments may change a frequency of processing to change a chip rate or utilize a scaling factor. Changing frequency of processing may include changing an interpolation rate, an interrupt rate, and/or a decimation rate. In some embodiments, a chip rate may be changed or a scaling factor utilized through filtering, by decimation, and/or by changing a frequency of an ADC, a DAC, and/or an offline clock. A divider may be used to change the frequency of at least one clock.

In some embodiments, a flexible system or waveform may be a fractional system or waveform. Fractional systems and/or waveforms may or may not change bandwidth for example. A fractional system or waveform may be flexible because it may offer more possibilities than a normal system or waveform (e.g., N=1 system). A normal system or waveform may refer to a standard and/or legacy system or waveform.

Figure 2A:
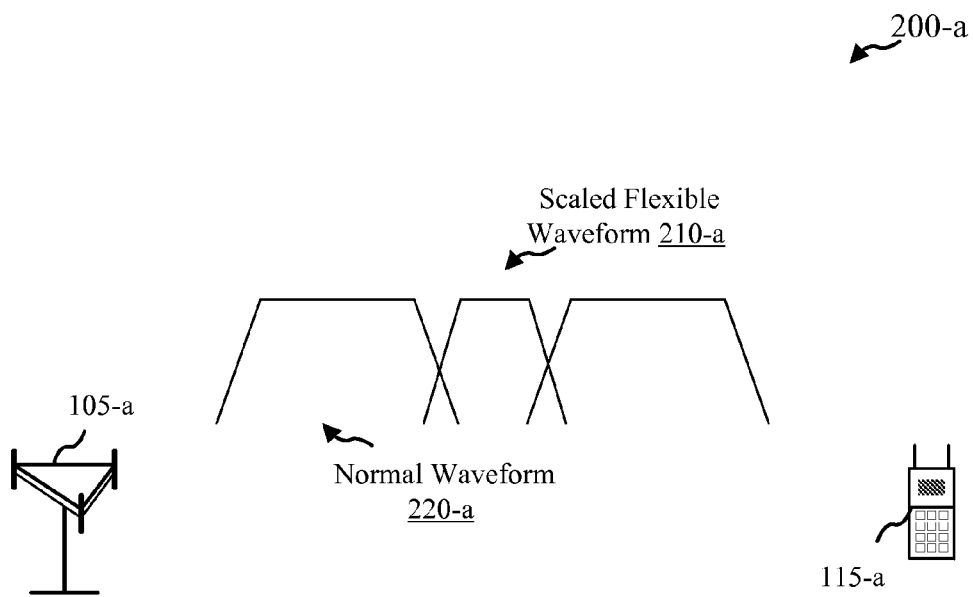
FIG. 2A shows an example of a wireless communications system where a flexible waveform fits into a portion of spectrum not broad enough to fit a normal waveform in accordance with various embodiments.

FIG. 2A shows an example of a wireless communications system 200-*a* with a base station 105-*a* and a mobile device 115-*a* in accordance with various embodiments, where a scaled flexible waveform 210-*a* fits into a portion of spectrum not broad enough to fit a normal waveform 220-*a*. System 200-*a* may be an example of system 100 of FIG. 1. In some embodiments, the scaled flexible waveform 210-*a* may overlap with the normal waveform 220-*a* that either the base 105-*a* and/or the mobile device 115-*a* may transmit. In some cases, the normal waveform 220-*a* may completely overlap the scaled flexible waveform 210-*a*. Some embodiments may also utilize multiple scaled flexible waveforms 210. In some embodiments, another base station and/or mobile device (not shown) may transmit the normal waveform 220-*a* and/or the scaled flexible waveform 210-*a*.

Figure 2B:
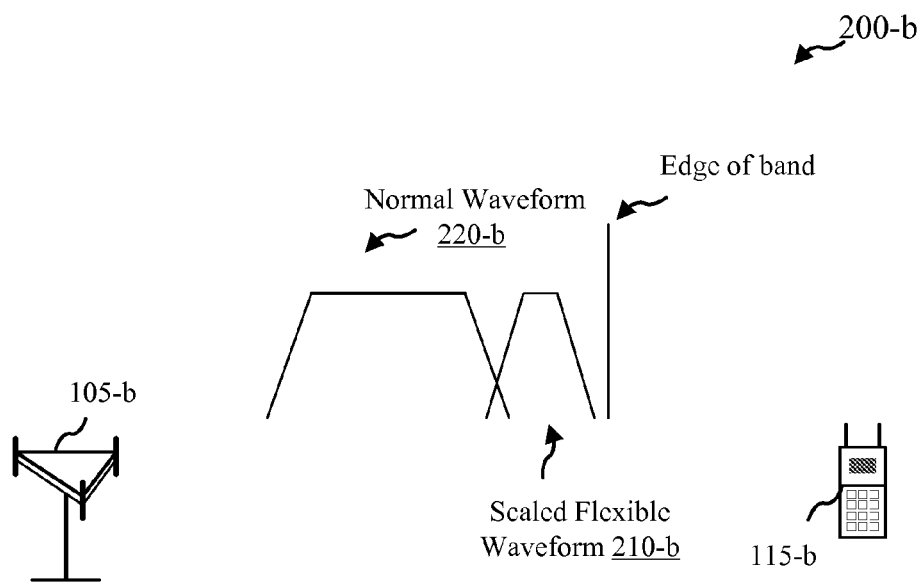
FIG. 2B shows an example of a wireless communications system where a flexible waveform fits into a portion of spectrum near an edge of a band in accordance with various embodiments.

In some embodiments, the mobile device 115-*a* and/or the base station 105-*a* may be configured to support voice by transmitting and receiving voice frames over multiple code channels and/or transmitting and receiving a subset of subframes of voice frames. FIG. 2B shows an example of a wireless communications system 200-*b* with a base station 105-*b* and mobile device 115-*b*, where a scaled flexible waveform 210-*b* fits into a portion of spectrum near an edge of a band, which may be a guard band, where normal waveform 220-*b* may not fit. System 200-*b* may be an example of system 100 of FIG. 1.

Figure 3:
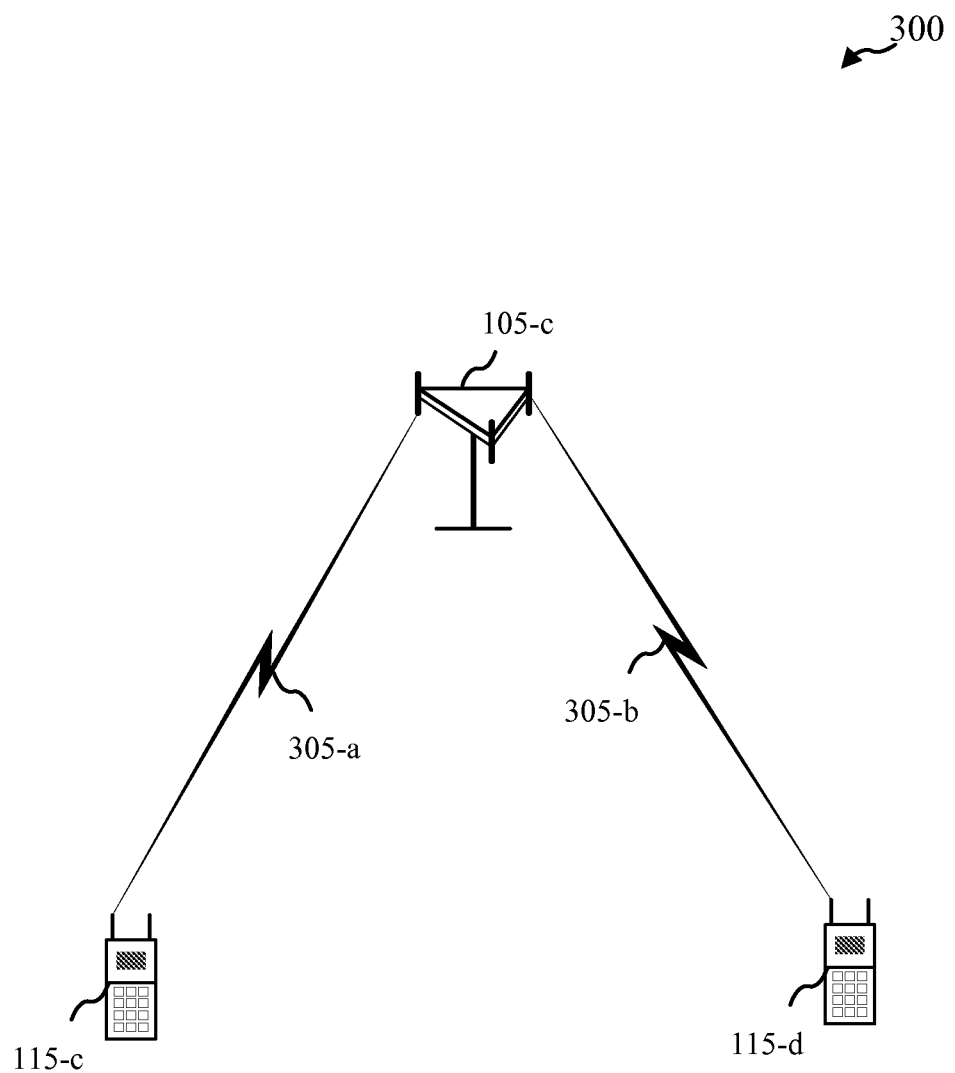
FIG. 3 shows a block diagram of a wireless communications system in accordance with various embodiments.

FIG. 3 shows a wireless communications system 300 with a base station 105-*c* and mobile devices 115-*c* and 115-*d*, in accordance with various embodiments. In some embodiments, the base station 105-*c* may be configured to support voice over multiple code channels of the wireless communications system. Base station 105-*c* and/or mobile devices 115-*c* and 115-*d* may utilize flexible or normal bandwidth systems and transmit a voice frame in parallel over multiple code channels or utilizing an offset. Base station 105-*c* and/or mobile devices 115-*c* and 115-*d* may transmit voice frames over a number of code channels that is greater than the scaling factor of the flexible bandwidth code channels. Base station 105-*c* and/or mobile devices 115-*c* and 115-*d* may transmit and/or receive a subset of subframes of voice frames over flexible bandwidth code channels. Base station 105-*c* and/or mobile devices 115-*c* and 115-*d* may transmit less than the number of subframes in a fully encoded voice frame and/or attempt decode of the voice frame transmitted from mobile devices 115-*c*/115-*d* and/or base station 105-*c* based on the subset of subframes of the fully encoded voice frame. Outer loop power control may be adjusted based on the number of transmitted subframes in each voice frame to provide a predetermined frame error rate.

Transmissions 305-*a* and/or 305-*b* between the mobile device 115-*c*/115-*d* and the base station 105-*c* may utilize flexible waveforms that may be generated to occupy less (or more) bandwidth than a normal waveform. For example, at a band edge, there may not be enough available spectrum to place a normal waveform. For a flexible waveform, as time gets dilated, the frequency occupied by a waveform goes down, thus making it possible to fit a flexible waveform into spectrum that may not be broad enough to fit a normal waveform. In some embodiments, the flexible waveform may be scaled utilizing a scaling factor N with respect to a normal waveform. Scaling factor N may take on numerous different values including, but not limited to, integer values such as 1, 2, 4, etc. N, however, does not have to be an integer.

Some embodiments may utilize additional terminology. A new unit D may be utilized. The unit D is dilated. The unit is unitless and has the value of N. One can talk about time in the flexible system in terms of "dilated time." For example, a slot of say 10 ms in normal time may be represented as 10 Dms in flexible time (note: even in normal time, this will hold true since N=1 in normal time: D has a value of 1, so 10 Dms=10 ms). In time scaling, one can replace most "seconds" with "dilated-seconds." Note frequency in Hertz is 1/s.

As discussed above, a flexible waveform may be a waveform that occupies less bandwidth than a normal waveform. Thus, in a flexible bandwidth system, the same number of symbols and bits may be transmitted over a longer duration compared to a normal bandwidth system. This may result in time stretching, whereby slot duration, frame duration, etc., may increase by a scaling factor N. Scaling factor N may represent the ratio of the normal bandwidth to flexible bandwidth (BW). Thus, data rate in a flexible bandwidth system may equal (Normal Rate×1/N), and delay may equal (Normal Delay×N). In general, a flexible systems channel BW=channel BW of normal systems/N. Delay×BW may remain unchanged. Furthermore, in some embodiments, a flexible waveform may be a waveform that occupies more bandwidth than a normal waveform. In this instance, the scaling factor N is less than 1.

Throughout this specification, the term normal system, subsystem, and/or waveform may be utilized to refer to systems, subsystems, and/or waveforms that involve embodiments that may utilize a scaling factor that may be equal to one (e.g., N=1) or a normal or standard chip rate. These normal systems, subsystems, and/or waveforms may also be referred to as standard and/or legacy systems, subsystems, and/or waveforms. Furthermore, flexible systems, subsystems, and/or waveforms may be utilized to refer to systems, subsystems, and/or waveforms that involve embodiments that may utilize a scaling factor that may be not equal to one (e.g., N=2, 4, 8, 1/2, 1/4, etc.). For N>1, or if a chip rate is decreased, the bandwidth of a waveform may decrease. Some embodiments may utilize scaling factors or chip rates that increase the bandwidth. For example, if N<1, or if the chip rate is increased, then a waveform may be expanded to cover bandwidth larger than a normal waveform. Flexible systems, subsystems, and/or waveforms may also be referred to as fractional systems, subsystems, and/or waveforms in some cases. Fractional systems, subsystems, and/or waveforms may or may not change bandwidth, for example. A fractional system, subsystem, or waveform may be flexible because it may offer more possibilities than a normal or standard system, subsystem, or waveform (e.g., N=1 system).

A flexible waveform may be a waveform that occupies less bandwidth than a normal waveform. For example, at the band edge, there may not be enough available spectrum to place a normal waveform. Unlike normal waveforms, there can be partial or complete overlap between normal and flexible waveforms. It is to be noted that the flexible waveform may increase the system capacity. There can be a trade off between extent of overlap and the bandwidth of the flexible waveform. The overlap may create additional interference. Embodiments may be directed at methods, systems, and/or devices and be aimed at reducing the interference.

Various wireless communications systems transmit voice communications using encoded voice packet transmission over a traffic channel of the wireless system. For example, transmissions 125, 305-$a$, and/or 305-$b$ of wireless systems 100 and/or 300 of FIG. 1 and FIG. 3 may represent traffic channels used to carry voice transmissions between mobile devices 115 and base stations 105. The traffic channel may be a logical traffic channel that is connected to a circuit switched network at base stations 105 and/or mobile devices 115 to provide voice communications.

The voice communications may be encoded into speech packets and the speech packets may be transmitted as modulated signals. For example, a speech codec may be used to take voice samples at the mobile device and/or base station and generate a speech packet at a predetermined timing interval or frame rate. Each speech packet may then be transmitted at the frame rate over the traffic channel. A traffic channel frame period may be defined by the same time period as the speech frame rate used for encoding.

For example, a traffic channel frame in a normal system may be defined by a frame period and a speech packet may be transferred over the traffic channel for each traffic channel frame period. At the receiver side, the speech packets may be received and decoded into voice samples. The voice frame delay between the analog or digital input voice signal at the originating device and the corresponding analog or digital output voice signal at the receiving device may therefore include the frame period for capturing a speech vector, encoding delay to generate the speech packet, the transmission delay (e.g., the frame period), and/or other processing overhead (e.g., MAC to PHY layer processing, and the like). While some voice frame delay is tolerable, perceived channel quality generally improves with reduced voice frame delay. For example, a voice frame delay of greater than 100 ms or 200 ms may be noticeable for some users.

Channel conditions such as interference may cause bit errors in decoding of received speech packets or voice frames. A received voice frame with insufficient frame quality (i.e., more than a certain number of bit errors) may be considered a bad frame. However, loss of a frame in audio application results only in loss of a fraction of a second of audio data, which can be made unnoticeable with suitable error concealment algorithms. Therefore, voice communications may still be considered acceptable with a certain amount of bad frames. For example, an FER of 1% may typically be considered acceptable for voice communications.

The speech codec may employ variable coding rates. For example, an active speech frame may be encoded at a full bit rate while a frame encoding only background noise or less complex speech pattern may be encoded at a lower bit rate. For example, a voice codec may employ full, half, quarter, eighth, and/or other bit rates for transmission of various frames based on the amount of information in the encoded speech frame.

The mobile device 115 and/or base station 105 may transmit communications using a power control scheme. The power control scheme may modify transmit power to achieve an acceptable or desired FER or signal-to-interference ratio (SIR) based on long-term channel variations. For example, a transmit power setting for a mobile device may be set according to a target FER based on expected or measured channel variations such as path loss. The target FER may be determined by type of communications (e.g., voice, UDP, TCP/IP, etc.), system loading, and/or other considerations.

The power control scheme may utilize closed-loop power control including an initial or target setting based on long-term channel variations and a closed-loop power control that occurs at the physical channel level (e.g., Layer 1) to substantially maintain the received power even in the presence of short-term channel variations such as fast fading. For example, the closed-loop power control may occur at a frequency within a range of 50 Hz to 2000 Hz. Closed-loop power control may be performed by adapting the transmission power during defined transmission time periods based on signal quality feedback. In embodiments, the transmission power is adaptively controlled over multiple time periods in each data frame. For example, each frame may be made up of multiple subframes, where transmit power is adaptively varied for each subframe based on channel quality feedback. Subframes may include interleaved data and/or data redundancies to reduce the effects of temporary channel loss. For example, spreading, symbol repetition, and/or interleaving of speech data during encoding and/or generation of subframes may be employed to improve the robustness of transmission of encoded subframes.

Closed-loop power control may include outer loop power control that operates either statically or varies at a slow rate (e.g., typically below 50-100 Hz) and inner loop power control that operates at a higher rate (e.g., typically higher than 50-100 Hz). For example, an outer-loop power control setpoint may define an FER for communication of frames made up of one or more sub-frames. Inner-loop power control may refer to closed-loop correction based on channel quality information (CQI) for received sub-frames. Inner-loop power control may be used to increase or decrease mean output power level for sub-frames based on channel feedback (via a control channel or forward/reverse power control subchannel of the fundamental channel, and the like).

Examples of wireless communications systems using closed-loop transmit power control schemes include UMTS and CDMA2000 1X systems. In UMTS systems, an outer loop power control set point may be set based on a target signal-to-noise ratio (SIR) or block error ratio (BLER). The outer-loop power control, also known as slow closed-loop power control, may be set by the mobile device and/or base station and may be changed at a rate of 10-100 Hz. Inner-loop power control, also known as fast closed-loop power control, may be performed in UMTS systems over multiple slots per frame (e.g., 15 slots per 10 ms frame, 30 slots per 20 ms frame, etc.). In CDMA2000 1X systems, closed-loop power control may be performed using an outer-loop power control set point that establishes a target FER and inner-loop power control that adjusts transmit power over subframe time periods known as power control groups (PCGs) to meet the target FER. For example, inner-loop power control may be performed at 800 Hz using 16 PCGs per 20 ms frame.

In one embodiment, a CDMA2000 1X traffic channel for voice communications (e.g., fundamental channel, etc.) carries voice in 20 ms frames with a variable data rate of 9.6 kbps for a full rate frame, 4.8 kbps for a half rate frame, 2.7 kbps for a quarter rate frame, or 1.5 kbps for a one-eighth rate frame. The CDMA2000 1X traffic channel may employ inner-loop power control where each 20 ms frame includes 16 PCGs, with each PCG transmitted in a 1.25 ms period and based on 1536 chips. The outer loop power control set-point for a CDMA2000 1X traffic channel may set an acceptable or desired FER for voice frames based on transmission of 16 PCGs for a full rate voice frame (e.g., 9.6 kbps). Inner loop power control may be employed in the CDMA2000 1X traffic channel to maintain an acceptable ratio of combined received energy per bit to effective noise power spectral density ($E_b/N_t$) for the given FER.

As described above, a flexible bandwidth system may transmit the same number of symbols and/or bits over a longer duration for a scaling factor N that is greater than 1. For these flexible waveforms, the frame duration increases by the scaling factor N. As a result, the data rate of the flexible waveform gets reduced and delay is introduced for transmission of a certain amount of bits or symbols by scaling of the waveform. The reduction in data rate and additional delay introduced by flexible waveforms in a flexible bandwidth system create challenges for supporting voice communications.

Some embodiments are directed to supporting voice communications using various novel techniques for transmitting voice frames over multiple code channels and/or transmitting a subset of subframes of voice frames. While these techniques are described with reference to voice communications, aspects of described embodiments may be applicable to other types of wireless communications. For example, aspects of disclosed embodiments may be applied to other real-time communications in wireless communications systems such as real-time transfer protocols used for voice telephony, streaming media, television, radio, video conferencing, and/or other time-sensitive communications.

Some embodiments transmit voice frames over multiple code channels of the wireless communications system. Such multi-code embodiments may utilize flexible or normal bandwidth systems. Multi-code embodiments include embodiments that utilize an offset between code channels and non-offset embodiments. In some embodiments, the number of code channels used is greater than the scaling factor of the flexible bandwidth code channels. While latency may be increased in some multi-code flexible bandwidth embodiments, other multi-code embodiments for flexible and/or normal bandwidth systems may have the same or even lower latency than a normal bandwidth single code channel system.

Other embodiments transmit a subset of sub-frames of voice frames over flexible bandwidth code channels. In these embodiments, a termination target that is less than the number of subframes in an encoded voice frame (e.g., full rate voice frame) may be defined based on a flexible bandwidth scaling factor of one or more code channels. The transmitter may transmit fewer than all subframes of the voice frame based on the termination target and the receiver may attempt decode of the voice frame based on the received subframes (i.e., attempt decode without receiving all subframes of the voice frame). An outer loop power control set-point may be adjusted to provide a predetermined FER at the termination target.

Figure 4A:
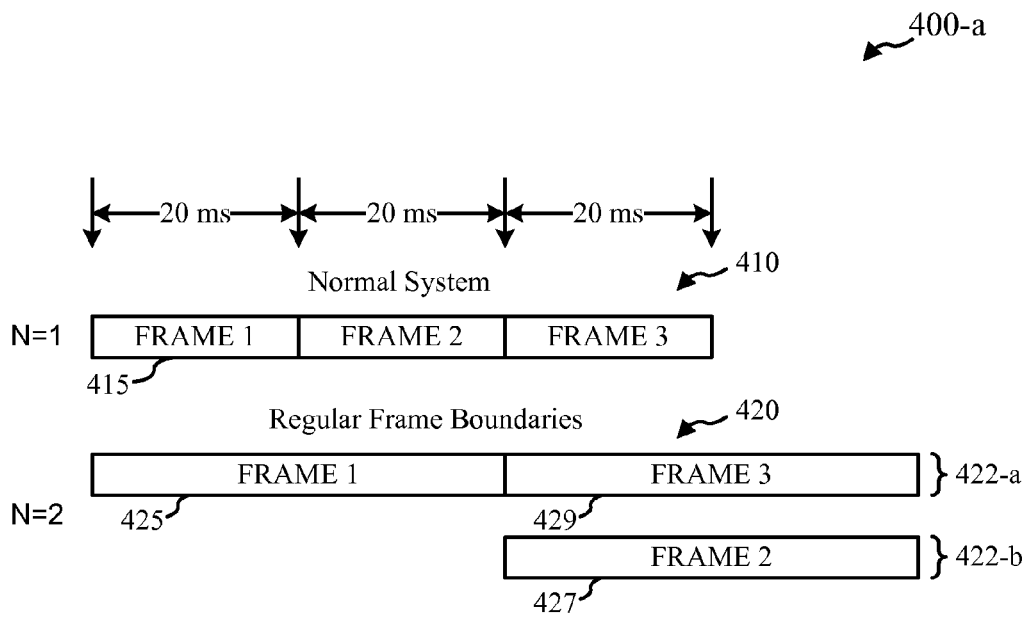
FIG. 4A shows a timing diagram of a voice communications system employing multiple code channels in accordance with various embodiments.

Turning next to FIGS. 4A to 4D, transmission of voice frames over multiple code channels is described in more detail. FIG. 4A shows a timing diagram 400-*a* that illustrates transmission of voice frames over multiple code channels using regular frame boundaries in accordance with various embodiments. In normal system 410 where the bandwidth scaling factor N is equal to 1, each voice frame (e.g., voice frame 415, etc.) is transmitted during a single frame period of 20 ms. Where the bandwidth scaling factor N is equal to 2 as illustrated in regular frame boundaries system 420, each traffic channel frame is dilated to be twice the duration of the traffic channel frames in the normal system 410. For example, the chip rate may be scaled by the bandwidth scaling factor, increasing the time duration for the bits or symbols transmitted in the traffic channel frame by the bandwidth scaling factor N.

In regular frame boundaries system 420 of FIG. 4A, a first voice frame 425 is transmitted on a first code channel 422-*a* starting at a frame boundary and the voice frame is transmitted over a two-frame period time duration, or 40 ms. A second voice frame 427 is transmitted on a second code channel 422-*b* at the frame boundary where transmission of the first voice frame 425 ends. A third voice frame 429 is transmitted in parallel with the second voice frame 427 on the first code channel 422-*a*. Subsequent frames are transmitted simultaneously on code channels 422-*a* and 422-*b* using the same two-frame period boundaries. With a bandwidth scaling factor N equal to 2 as illustrated in timing diagram 400-*a*, this embodiment incurs 40 ms of increase in voice frame latency (e.g., transmission delay increases from 20 ms to 60 ms for FRAME 2) compared to normal system 410.

Figure 4B:
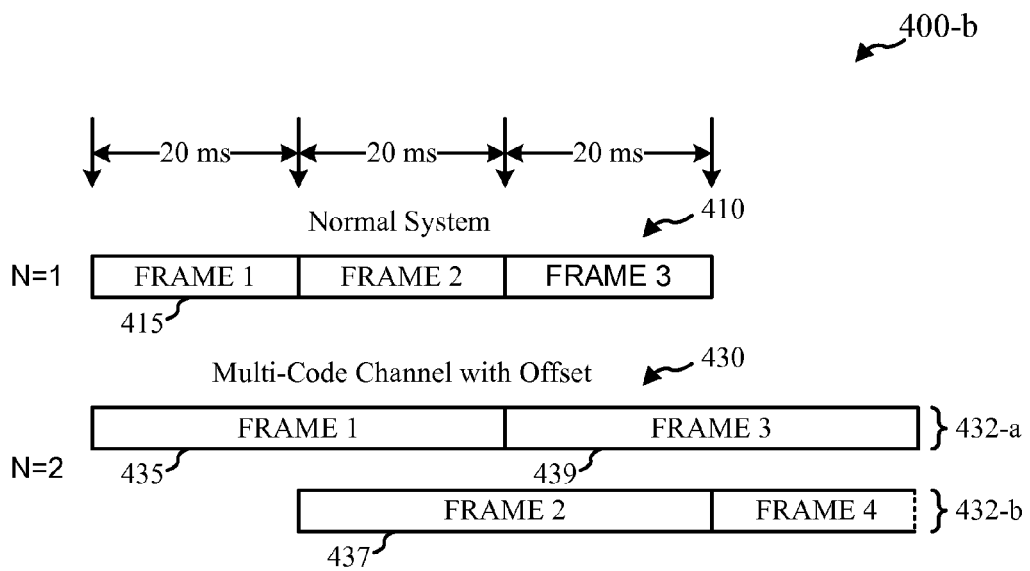
FIG. 4B shows a timing diagram of a voice communications system employing multiple code channels in accordance with various embodiments.

FIG. 4B shows a timing diagram 400-*b* that illustrates transmission of voice frames over multiple code channels using an offset in accordance with various embodiments. In multiple code channel with offset system 430 illustrated in timing diagram 400-*b*, a first voice frame 435 is transmitted on a first code channel 432-*a* starting at a first frame boundary. A second frame 437 is transmitted on a second code channel 432-*b* with an offset. In timing diagram 400-*b*, multiple code channel with offset system 430 uses a bandwidth scaling factor N equal to 2 and the second frame 437 is offset by one frame period from the first voice frame 435. A third voice frame 439 is transmitted after the first voice frame 435 on the first code channel 432-*a*. Multiple code channel with offset system 430 may reduce frame latency compared to using regular frame boundaries. For example, multiple code channel with offset system 430 using flexible bandwidth waveforms and a scaling factor N equal to 2 incurs 20 ms of additional frame latency as compared to normal system 410 instead of the 40 ms for regular frame boundary system 420.

Figure 4C:
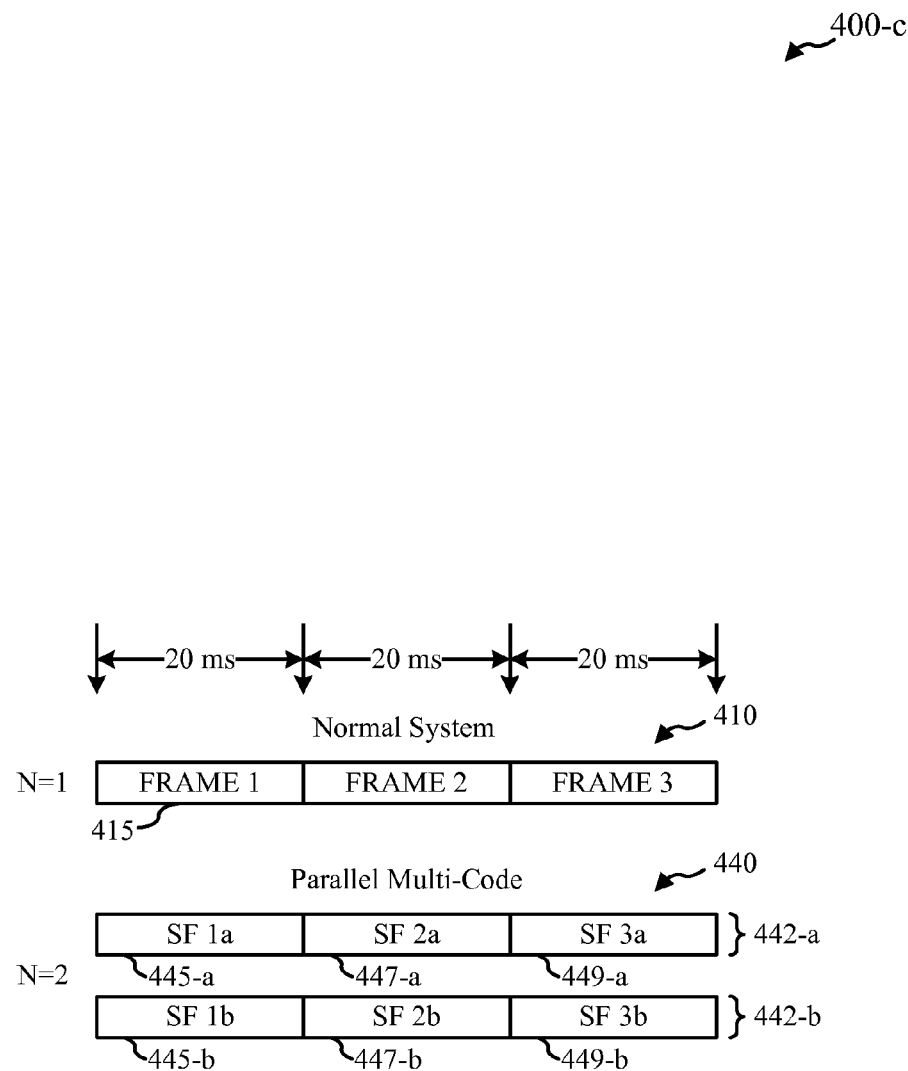
FIG. 4C shows a timing diagram of a voice communications system employing multiple code channels in accordance with various embodiments.

FIG. 4C shows a timing diagram 400-*c* that illustrates transmission of voice frames over multiple code channels using subframes in accordance with various embodiments. As illustrated in timing diagram 400-*c*, parallel multi-code system 440 splits a first voice frame into two sub-frames 445-*a* and 445-*b* and the sub-frames are transmitted in parallel over the first code channel 442-*a* and the second code channel 442-*b*. Subsequent voice frames are also split into voice sub-frames (e.g., 447-*a*, 447-*b*, 449-*a*, and 449-*b*, etc.) and transmitted in parallel over code channels 432-*a* and 432-*b*. As illustrated in timing diagram 400-*c*, a full voice frame may be transmitted during a single frame period using parallel multi-code system 440 with bandwidth scaling factor N equal to 2. As such, this embodiment incurs no increase in frame latency as compared to the normal system 410.

Figure 4D:
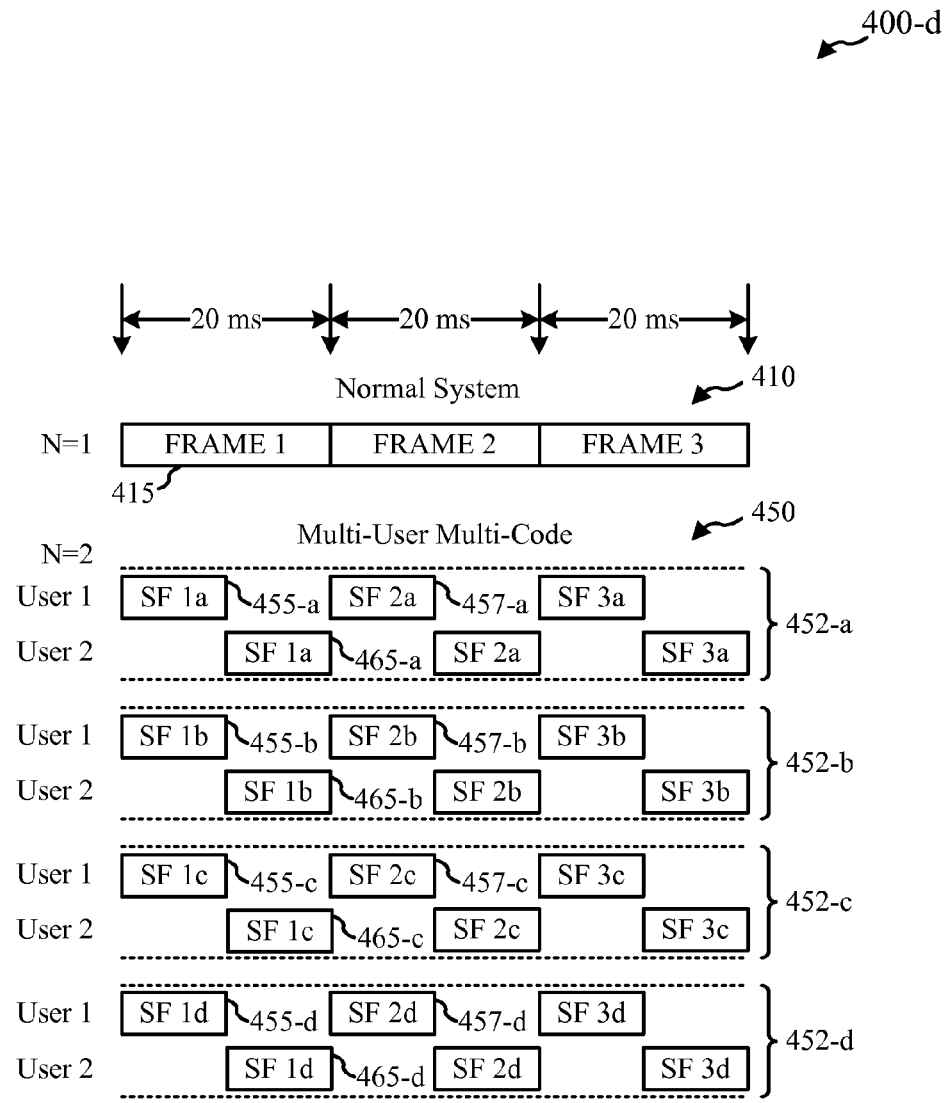
FIG. 4D shows a timing diagram of a voice communications system employing multiple code channels in accordance with various embodiments.

FIG. 4D shows a timing diagram 400-*d* that illustrates a multi-user multi-code system 450 that employs more code channels than necessary based on a particular bandwidth scaling factor in accordance with various embodiments. Multi-code multi-user system 450 is illustrated with four code channels and a bandwidth scaling factor N equal to 2.

According to multi-user multi-code system 450, a voice frame may be split into four subframes and transmitted simultaneously during only a portion of a frame period. For example, voice frame 455 may be split into four subframes 455-a, 455-b, 455-c, and 455-d. Each subframe is transmitted during a first portion of a first frame period on code channels 452-a, 452-b, 452-c, and 452-d. As illustrated in timing diagram 400-d, for a flexible bandwidth system with a scaling factor of 2 and using four code channels, each subframe takes half of a frame period for a normal system. Multi-user multi-code system 450 can thus be used to reduce frame latency compared to the normal system 410. That is, more code channels than necessary based on the scaling factor may be used to reduce the transmission delay for encoded voice data. In multi-user multi-code system 450, for example, the first voice frame 455 may be decoded half of a frame period earlier at the receiver than for a normal system. Each subsequent voice frame (e.g., 457-a, 457-b, 457-c, 457-d, etc.) also takes only half of a normal frame period to transmit over the multiple code channels, thereby reducing voice frame latency by one-half of the frame period. In timing diagram 400-d, this reduces voice frame latency by 10 ms as compared to the normal system 410.

As illustrated in timing diagram 400-d, multi-user multi-code system 450 may employ time division multiplexing to allow multiple users to share code channels. As illustrated in timing diagram 400-d, a second user may transmit sub-frames 465-a, 465-b, 465-c, and 465-d on code channels 452-a, 452-b, 452-c, and 452-d during a second portion of the frame period where the first user is not transmitting. Multi-user multi-code system 450 may also reduce voice frame latency for the second user.

While various flexible bandwidth systems illustrated in FIGS. 4A-4D are described with reference to a bandwidth scaling factor N equal to 2, these techniques may be used with other bandwidth scaling factors, including a bandwidth scaling factor of 1. For example, multi-user multi-code systems may be employed with integer scaling factors (e.g., 1, 2, 3, 4, 8, etc.) or non-integer scaling factor. Generally, for non-integer scaling factors (e.g., 1/2, 3/2, 5/2, etc), the system uses a number of code channels given by the next highest integer, next highest integer divisible by 2, or next highest integer that is a power of 2. For example, for a flexible bandwidth scaling factor of 5/2, the system may use 3 or 4 code channels. For a flexible bandwidth scaling factor of 9/2, the system may use 5, 6, or 8 code channels. These embodiments may reduce voice frame latency of the voice communications and/or allow time division multiplexing of code channels.

Turning next to FIGS. 5A-5D, transmission of voice frames using a subset of subframes is described in accordance with various embodiments. As described above, a voice frame may be encoded in one or more encoded and/or interleaved subframes during a frame period, where each subframe is transmitted during one slot duration. Due to redundancies in frame data, a voice frame may be able to be decoded before all subframes for a particular voice frame are received. For example, in a CDMA2000 1X system a full data rate voice frame (e.g., 9.6 kbps voice data encoded in 16 PCGs in a 20 ms frame), may be decoded correctly after receipt of 15, 14, or even fewer PCGs. The probability of successful decode of the voice frame may depend on the number of received PCGs and the transmit power level or target FER. For example, with outer loop power control set to achieve 1% FER after receiving all 16 PCGs, there may be approximately a 95% chance of correctly decoding a full rate voice frame after 14 PCGs are received (i.e., FER of 5%), approximately a 90% chance of correctly decoding a full rate voice frame after 12 PCGs are received (i.e., FER of 10%), and approximately a 60% chance of correctly decoding a full rate voice frame after only 8 PCGs are received (i.e., FER of 40%).

Figure 5A:
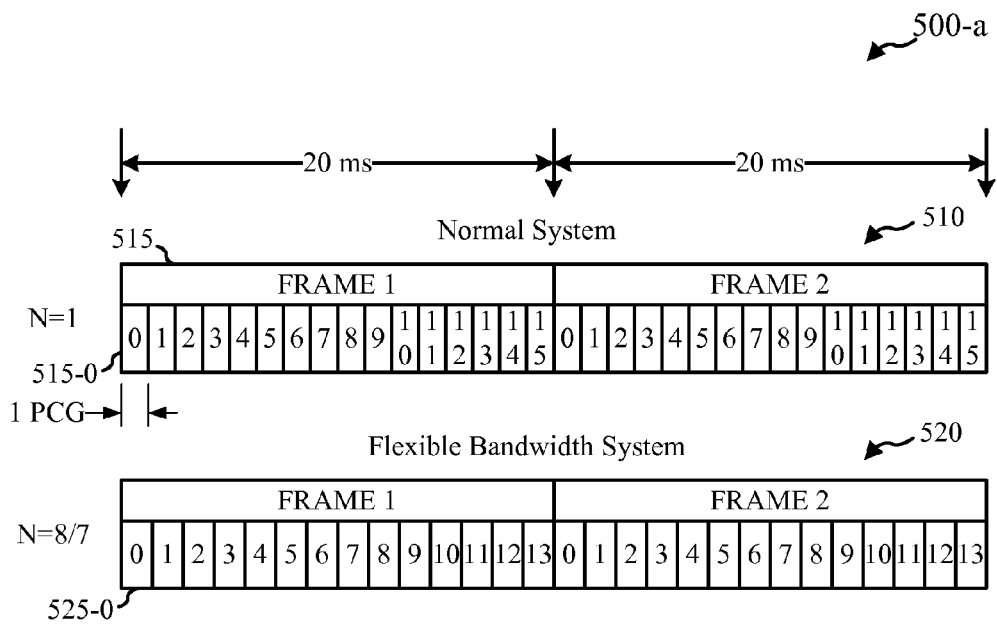
FIG. 5A shows a timing diagram of a flexible bandwidth voice communications system in accordance with various embodiments.

As illustrated in FIG. 5A, a first voice frame 515 in a normal system 510 may be transmitted over a 20 ms frame period in 16 subframes, with each subframe (e.g., subframe 515-0, etc.) transmitted over a slot duration of 1.25 ms. As described above, a flexible bandwidth waveform may result in dilation of frame timing. For example, a flexible bandwidth waveform with bandwidth scaling factor N>1 will result in the same number of symbols and bits transmitted over a longer time duration as compared to a normal system.

In timing diagram 500-a, a flexible bandwidth system 520 employs a flexible bandwidth waveform with a flexible bandwidth scaling factor N of 8/7. In this instance, the dilation of frame timing due to the bandwidth scaling factor would result in a frame period of 22.9 ms if all 16 subframes of first voice frame 515 are transmitted over the flexible bandwidth waveform. For full rate voice transmission, where each voice frame includes 16 subframes, the increase in frame period from 20 ms to 22.9 ms would quickly cause excess voice latency and degraded voice quality.

As illustrated in FIG. 5A, flexible bandwidth system 520 transmits a subset of subframes to maintain a 20 ms frame period over the flexible bandwidth waveform with scaling factor N equal to 8/7. In system 520, only 14 of 16 subframes (e.g., subframe 525-0, etc.) of each voice frame are transmitted. Because of the flexible bandwidth waveform, the 14 subframes transmitted in flexible bandwidth system 520 may occupy substantially the same 20 ms frame period as 16 subframes in normal system 510.

As described above, the frame error rate may increase as the number of subframes received per voice frame is decreased. Higher transmit power may be used to increase the effective noise power spectral density ($E_b/N_t$), which may provide the same FER with fewer transmitted subframes. In some embodiments, the outer-loop power control set-point is adjusted to compensate for transmission of less than all encoded subframes in a voice frame. The outer-loop power control set-point may be adjusted to provide a predetermined frame error rate with transmission of a subset of subframes of the voice frame. For example, a termination target for a flexible bandwidth code channel may be based on the scaling factor N of the flexible bandwidth waveform for the code channel. The outer-loop power control set-point for the flexible bandwidth waveform may be set to provide a predetermined FER at the termination target. For example, the outer-loop power control set-point for the flexible bandwidth waveform may be set such that the FER is equal to or less than 1% at the termination target. Alternatively, the outer-loop power control set-point may be set for a lower or higher FER at the termination target based on an acceptable voice quality metric.

In flexible bandwidth system 520, the outer loop power control set-point may be adjusted to provide an acceptable voice quality at the termination target of 14 subframes. For example, the receiving mobile device and/or base station may measure the frame error rate at the termination target and determine an adjustment for providing a predetermined frame error rate at the termination target. The transmitting mobile device and/or base station may adjust the outer loop power control set-point accordingly. As such, the flexible bandwidth system 520 may provide full rate voice quality in a flexible bandwidth waveform that takes up less bandwidth than a typical full rate voice communication using a normal waveform.

Figure 5B:
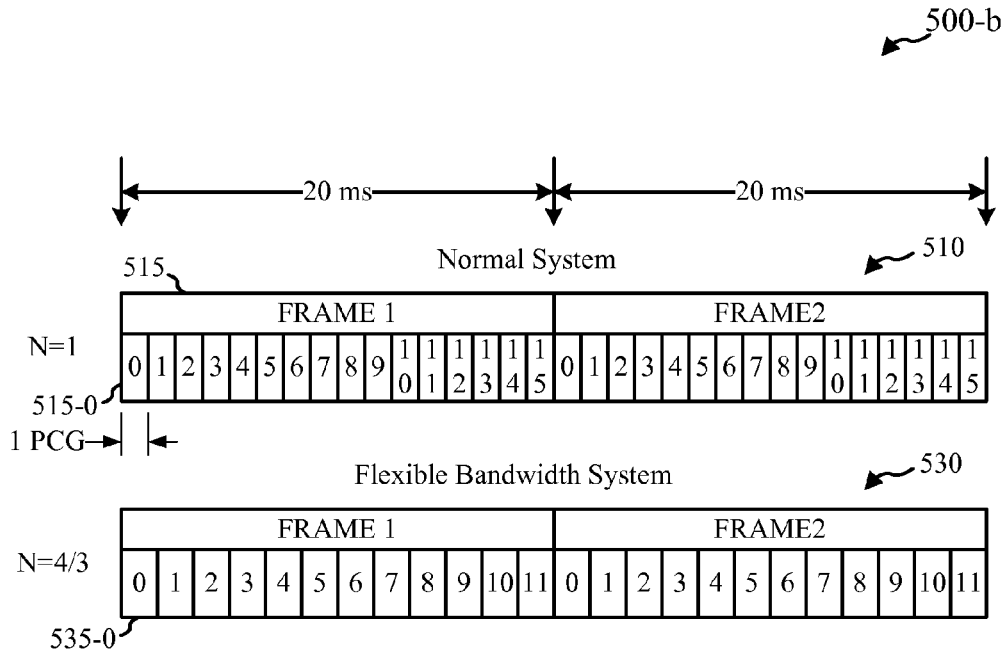
FIG. 5B shows a timing diagram of a flexible bandwidth voice communications system in accordance with various embodiments.
Figure 5C:
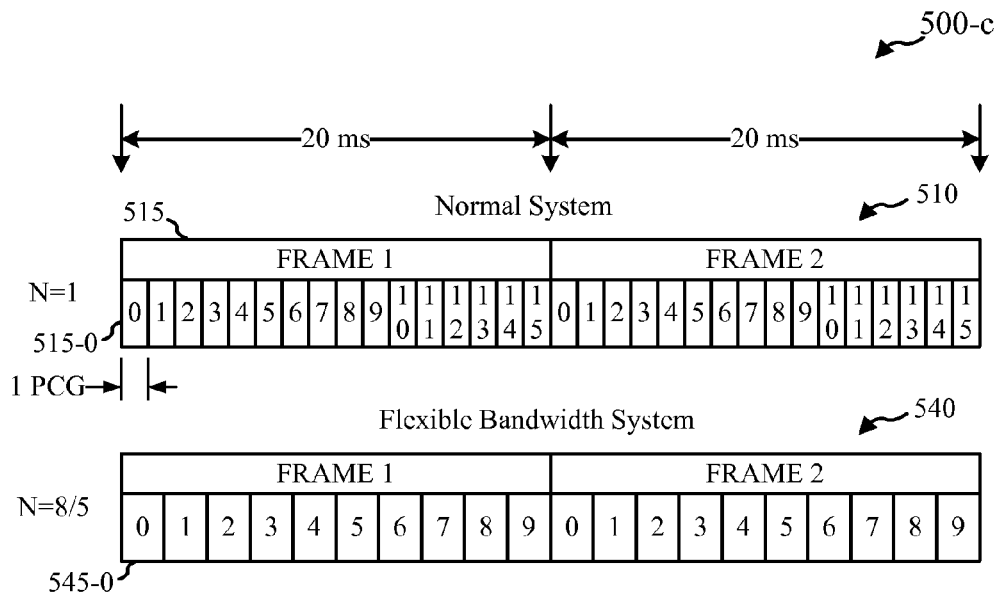
FIG. 5C shows a timing diagram of a flexible bandwidth voice communications system in accordance with various embodiments.
Figure 5D:
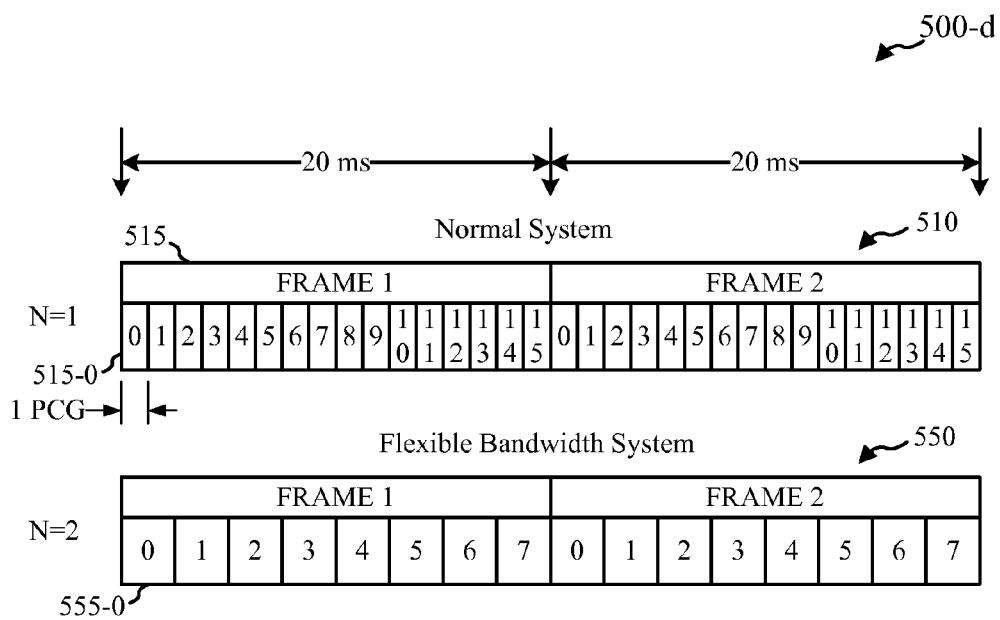
FIG. 5D shows a timing diagram of a flexible bandwidth voice communications system in accordance with various embodiments.

Turning next to FIG. 5B, FIG. 5C, and FIG. 5D, timing diagrams 500-b, 500-c, and 500-d illustrate flexible bandwidth systems 530, 540, and 550 in accordance with various embodiments. Flexible bandwidth systems 530, 540, and 550 support voice transmission employing flexible bandwidth waveforms with flexible bandwidth scaling factors N of 4/3, 8/5, and 2, respectively. Within a standard voice frame duration, flexible bandwidth system 530 may transmit 12 subframes (e.g., subframe 535-0, etc.), while flexible bandwidth system 540 transmits 10 subframes (e.g., subframe 545-0, etc.), and flexible bandwidth system 550 transmits 8 subframes (e.g., subframe 555-0, etc.). The outer-loop power control set-points for flexible bandwidth systems 530, 540, and/or 550 may be set to provide an acceptable FER based on the termination targets of the flexible bandwidth code channels.

Figure 6A:
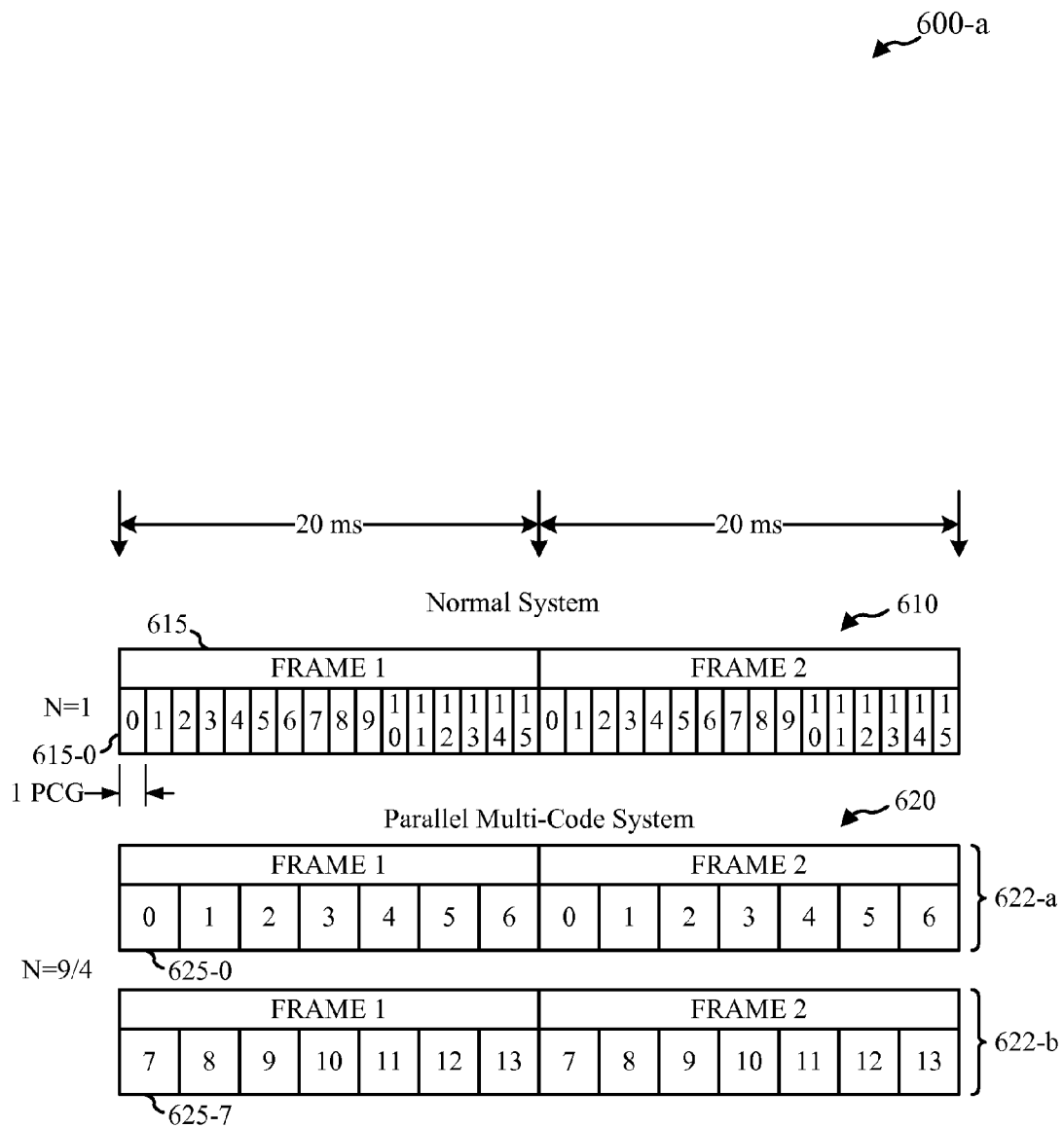
FIG. 6A shows a timing diagram of a flexible bandwidth voice communications system employing multiple code channels in accordance with various embodiments.

In embodiments, transmission of a subset of subframes may be utilized in combination with multi-code embodiments. FIG. 6A shows a timing diagram 600-a illustrating a normal system 610 transmitting a voice frame 615 in 16 subframes (e.g., subframe 615-0, etc.) over 20 ms frame periods and a parallel multi-code system 620 in accordance with various embodiments. In the illustrated embodiment, parallel multi-code system 620 transmits less than the 16 subframes for each voice frame, with the subframes re-ordered across code channels 622-a and 622-b. As illustrated in FIG. 6A, 14 subframes (e.g., subframes 625-0, 625-7, etc.) may be transmitted during each slot duration of normal system 610 by parallel multi-code system 620 using two flexible bandwidth code channels 622-a and 622-b with bandwidth scaling factor N equal to 9/4. As with embodiments illustrated in FIGS. 5A, 5B, 5C, and 5D, the outer-loop power control set-point may be used to maintain voice quality (e.g., less than 1% FER, etc.) of parallel multi-code system 620. While timing diagram 600-a illustrates parallel multi-code system 620 using a bandwidth scaling factor N equal to 9/4, other bandwidth scaling factors may be used. For example, parallel multi-code system 620 may be used with a bandwidth scaling factor N equal to 8/3 for code channels 622-a and 622-b. In this instance, six of the 16 total subframes may be transmitted during each 20 ms frame period on each flexible bandwidth code channel.

Figure 6B:
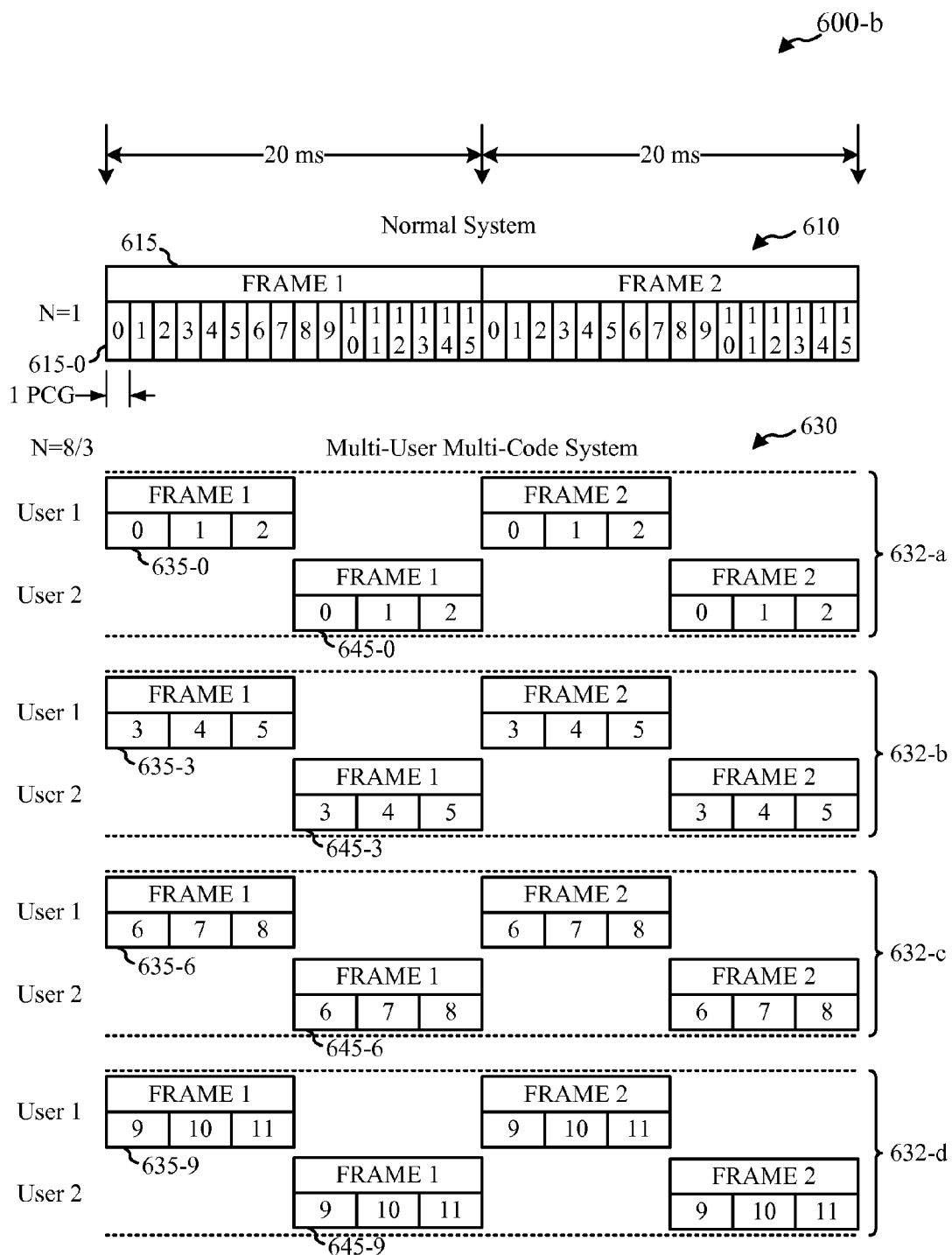
FIG. 6B shows a timing diagram of a flexible bandwidth voice communications system employing multiple code channels in accordance with various embodiments.

FIG. 6B shows a timing diagram 600-b illustrating a multi-user multi-code system 630 in accordance with various embodiments. In multi-user multi-code system 630, twelve subframes of a first frame (e.g., 635-0, 635-3, 635-6, 635-9, etc.) are re-ordered and transmitted during a first portion of a frame period using four flexible bandwidth code channels 632-a, 632-b, 632-c, and 632-d with flexible bandwidth scaling factor N of 8/3. In multi-user multi-code system 630, each frame period may be time multiplexed with multiple users transmitting at different portions of the frame period on each code channel. For example, in timing diagram 600-b, a second user transmits a voice frame (e.g., subframes 645-0, 645-3, 645-6, 645-9, etc.) during a second portion of the frame period.

Some embodiments may provide for latency management for flexible bandwidth systems. For example, once a first voice frame is available at the MAC, it may be delivered to the PHY. After some PHY layer processing possibly, the over-the-air transmission may be allowed to start only at the next radio frame boundary due to the current specification restrictions. For a flexible bandwidth system, this may imply that the maximum latency can be as large as one dilated radio frame or, in some embodiments, 10 ms×N, which may be very undesirable when N is large.

Some embodiments address this problem such that the physical layer transmission can be allowed at a slot boundary. For example, some embodiments define the 20 ms window as a "sub-TTI" for voice services. The number of time slots contained in a sub-TTI may be calculated, in some embodiments, as $$n = \frac{2 \times 15}{N}.$$

The timing for the PHY transmission may depend on the value of n.

For example, if n is an integer (e.g., N=2, 3, 5, 6), once the voice frame may be delivered to the PHY, the transmission may be started at the next immediate slot boundary. Some embodiments may utilize the following timeline for this scenario, where $t_0$ is the time the voice frame 0 is delivered to the PHY, $t_1$ is the time when the PHY starts transmission at the next immediate slot boundary, $t_2$ is the time when voice frame 1 is delivered to the PHY, and $t_3$ is the time the transmission of voice frame 0 is completed and transmission of voice frame 1 is started. Note that the end of the sub-TTI may fall exactly on the slot boundary since it may contain an integer number of slots. The maximum delay may be upper bounded by a single slot, or 10 ms×N/15, in some embodiments.

If n is not an integer (e.g., N=4, 8), a transmission starting at the next immediate slot boundary may not be aligned, since the sub-TTI boundary may fall in the middle of a slot. Based on the above timeline, the time instants $t_2$ and $t_3$ both may fall in a single slot. For such cases, because the contents to be transmitted during this slot may need to be assembled before the transmission starts, it may be infeasible for the transmission of voice frame 1 to continue right after $t_3$, and thus, causing an undesired interruption.

Some embodiments may address this issue through delaying the start of transmission by one more slot, i.e., to start transmission at the second next slot boundary. The maximum delay may be upper bounded by two slots, or, in some embodiments, (2×10 ms×N/15). Some embodiments may delay the start of transmission by more than one more slot.

Figure 7A:
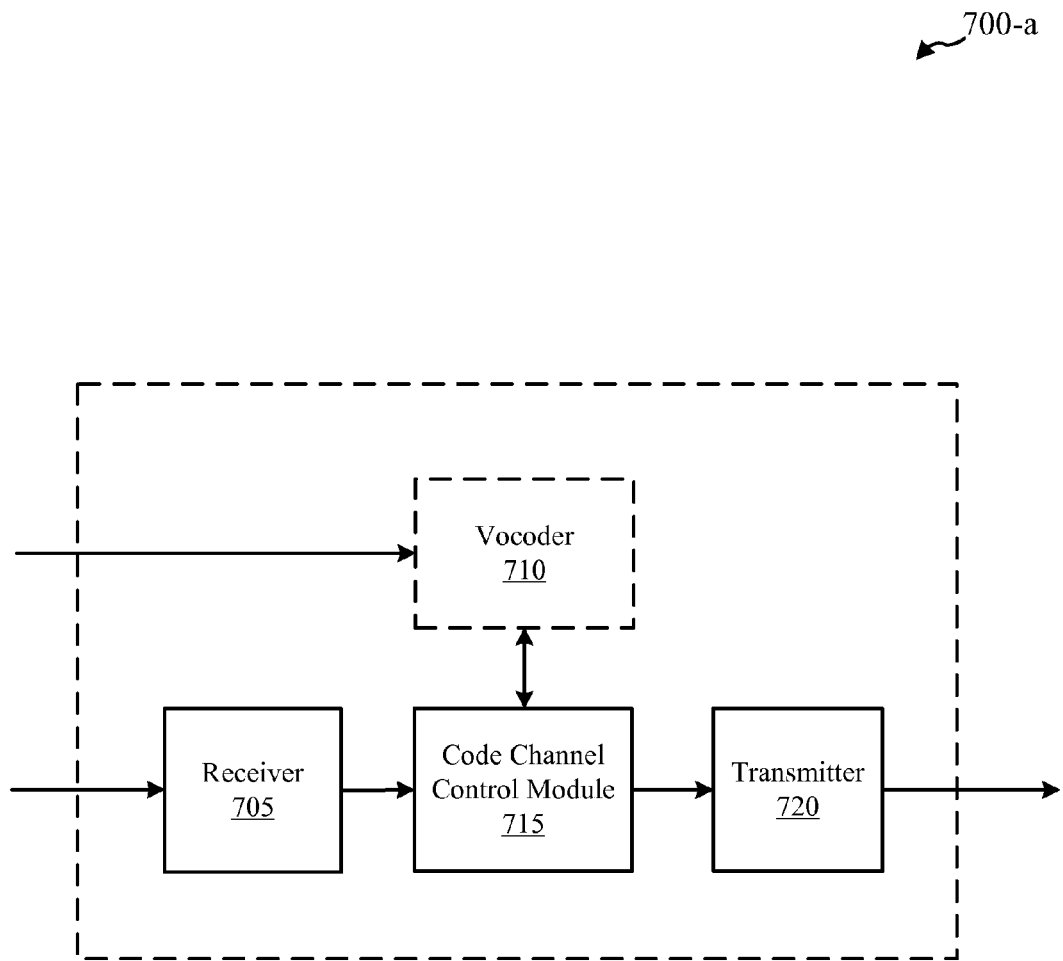
FIG. 7A shows a block diagram of a device configured to support voice communications over multiple code channels in accordance with various embodiments.

Turning next to FIG. 7A, a block diagram illustrates a device 700-a that may be employed for supporting voice communications over multiple code channels in accordance with various embodiments. The device 700-a may be an example of one or more aspects of base stations 105 and/or mobile devices 115 described with reference to FIG. 1, FIG. 2, FIG. 3, FIG. 9, FIG. 10, and/or FIG. 11. The device 700-a may also be a processor. The device 700-a may include a receiver module 705, a code channel control module 715, and/or a transmitter module 720. Some embodiments include a vocoder module 710 that generates voice frames from digital or analog voice input signals (e.g., microphone, digitizer, etc.). Each of these components may be in communication with each other. Device 700-a and/or its components may be configured to transmit and receive information from like configured devices and/or other devices such as device 700-b of FIG. 7B, for example.

The receiver module 705 may receive information such as packet, data, and/or signaling information regarding what device 700-a has received or transmitted. The receiver module may be configured to receive one or more code channels and communicate packet, data, and/or signaling information received over the one or more code channels to the code channel control module 715. The receiver module 705 may also receive voice data directly and thus include the functionality of vocoder module 710.

The code channel control module 715 may control functionality of the device 700-*a* with respect to one or more code channels. For example, code channel control module 715 may receive voice frames from vocoder module 710, split the voice frames into voice subframes, and encode the multiple voice subframes on multiple code channels. Transmitter module 720 may then transmit the voice frames over the multiple code channels. Code channel control module 715 may also receive subframes on multiple code channels through receiver module 705 and decode the voice frames into voice samples for connection to a circuit switched network and/or playback to the user (e.g., through a speaker, etc).

Figure 7B:
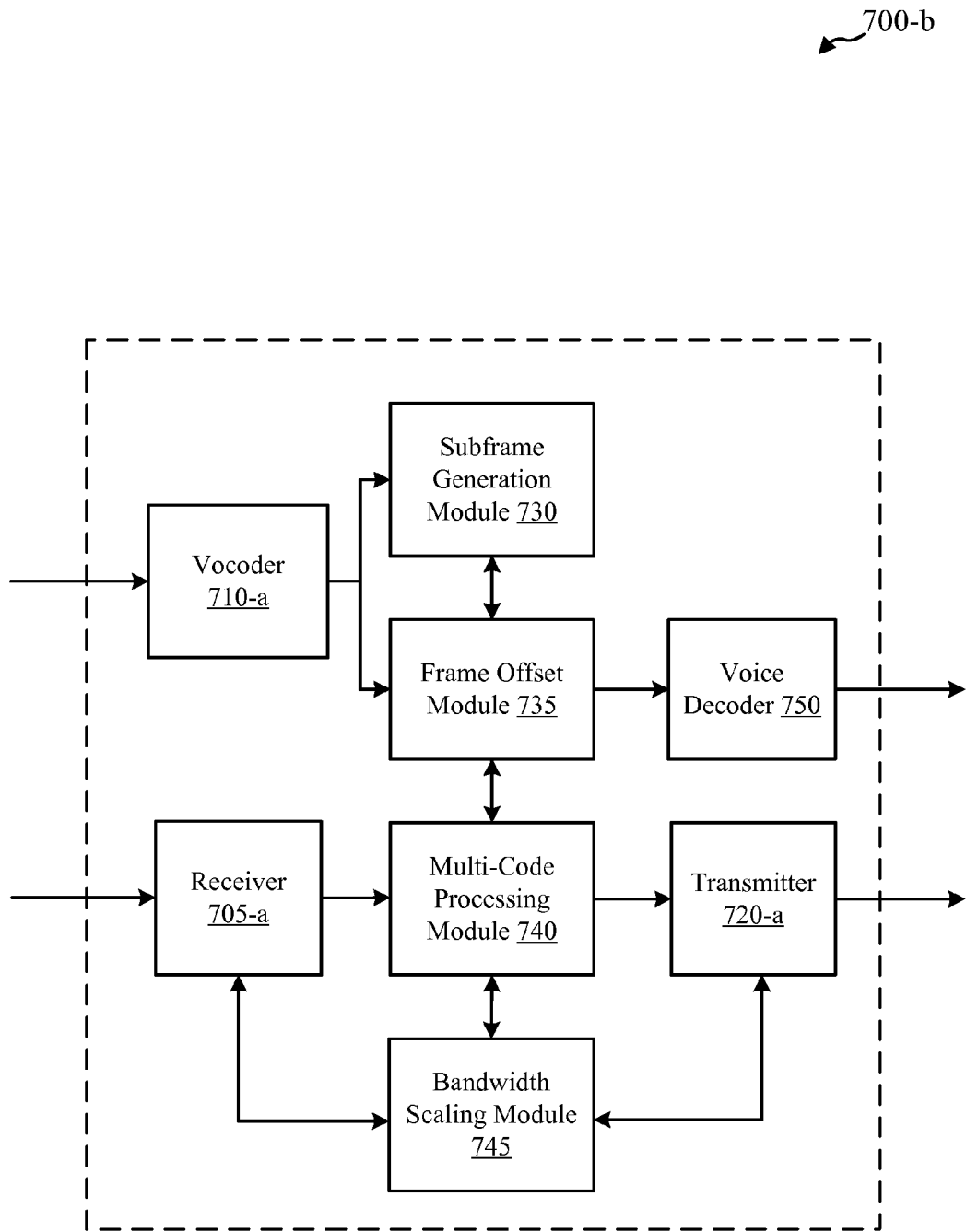
FIG. 7B shows a block diagram of a device configured to support voice communications over multiple code channels in accordance with various embodiments.

Turning next to FIG. 7B, a block diagram of a device 700-*b* that may be employed for supporting voice communications over multiple code channels is illustrated in accordance with various embodiments. The device 700-*b* may be an example of one or more aspects of base stations 105 and/or mobile stations 115 described with reference to FIG. 1, FIG. 2, FIG. 3, FIG. 9, FIG. 10, and/or FIG. 11. The device 700-*b* may also be a processor. Device 700-*b* may include a receiver module 705-*a*, a vocoder module 710-*a*, a transmitter module 720-*a*, a subframe generation module 730, a frame offset module 735, a multi-code processing module 740, a bandwidth scaling module 745, and/or a voice decoder module 750.

Subframe generation module 730 may receive voice frames from vocoder module 710 and generate multiple voice subframes from each voice frame. Frame offset module 735 may also receive the voice frames from vocoder module 710-*a* and/or subframes from subframe generation module 730 and control the offset of voice frames and/or subframes within a frame period or across frame periods. For example, frame offset module 735 may offset frames across multiple code channels in accordance with embodiments described with reference to FIG. 4B. Multi-code processing module 740 may manage multiple code channels and process voice frames and/or subframes transmitted and received via multiple code channels through receiver module 705-*a* and/or transmitter module 720-*a*. Bandwidth scaling module 745 may manage flexible bandwidths waveforms for receiver module 705-*a* and/or transmitter module 720-*a*. For example, bandwidth scaling module 745 may establish a bandwidth scaling factor for one or more flexible bandwidth code channels used to receive voice frames and/or subframes through receiver module 705-*a* or transmit voice frames and/or subframes through transmitter module 720-*a*.

In an example consistent with various embodiments, voice data (e.g., analog or digital voice signals) is received by vocoder module 710-*a* and voice frames are generated corresponding to specific frame periods. Bandwidth scaling module 745 determines available bandwidth and establishes multiple flexible bandwidth waveforms for supporting voice communications. Multi-code processing module 740 receives the flexible bandwidth information from bandwidth scaling module 745 and determines how to transmit the voice frames over the multiple flexible bandwidth waveforms. In communication with multi-code processing module 740, the voice frames are received by subframe generation module 730 and split into voice subframes according to the number of code channels to be used for transmission of the voice frames. The voice subframes are provided to multi-code processing module 740, which encodes the subframes for transmission by transmitter module 720-*a* over the multiple flexible bandwidth code channels. In some embodiments, voice frames and/or subframes are offset by frame offset module 735 before transmission.

Figure 8A:
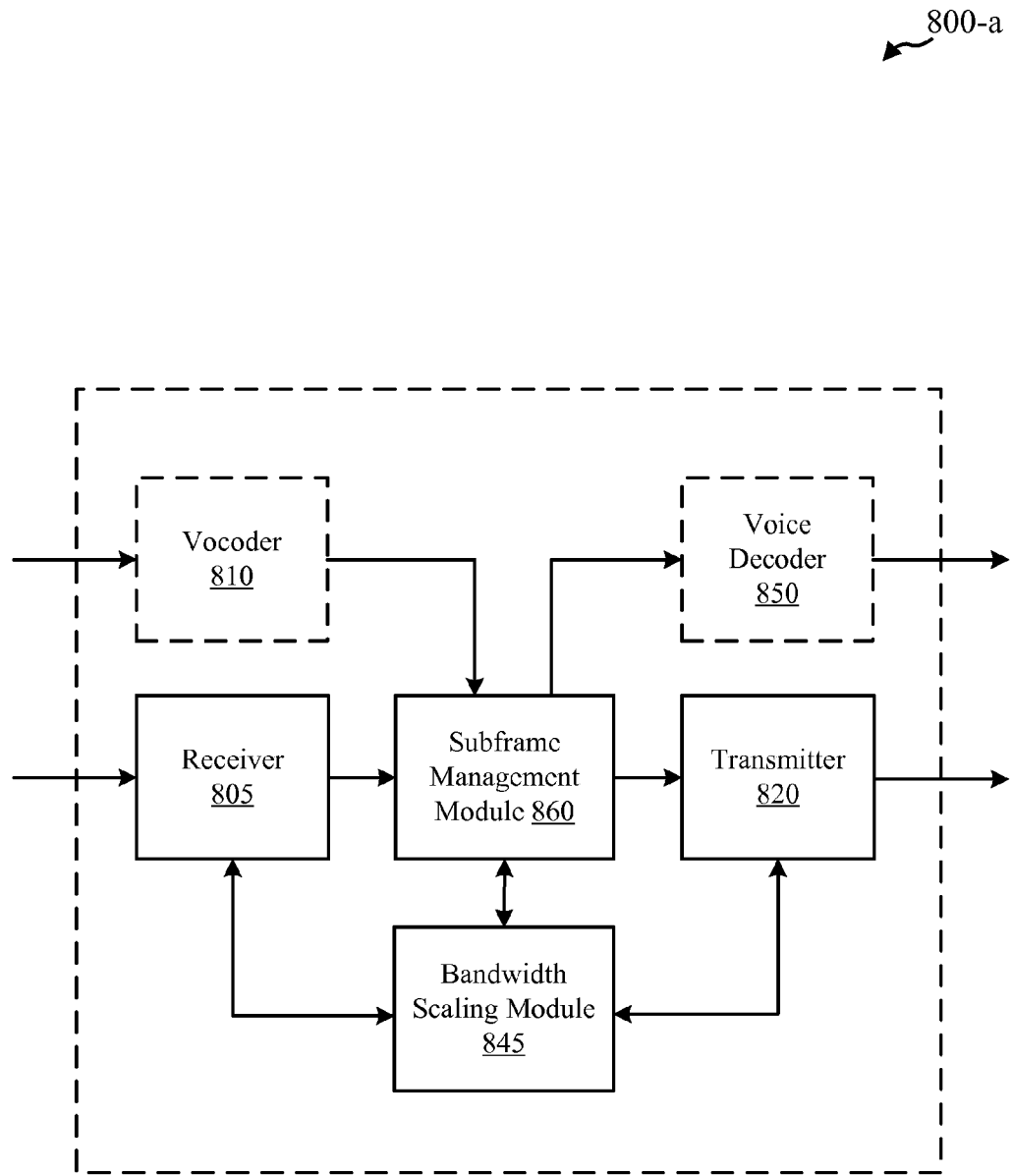
FIG. 8A shows a block diagram of a device configured to support voice communications using flexible bandwidth waveforms in accordance with various embodiments.

Turning next to FIG. 8A, a block diagram illustrates a device 800-*a* that may be employed to support voice communication using a subset of subframes of voice frames in accordance with various embodiments. The device 800-*a* may be an example of one or more aspects of base stations 105 and/or mobile stations 115 described with reference to FIG. 1, FIG. 2, FIG. 3, FIG. 9, FIG. 10, and/or FIG. 11. The device 800-*a* may also be a processor. The device 800-*a* may include a receiver module 805, a transmitter module 820, a bandwidth scaling module 845, and/or a subframe management module 860. In embodiments, the device 800-*a* may also include a vocoder module 810 and/or voice decoder module 850. Each of these components may be in communication with each other. Device 800-*a* and/or its components may be configured to transmit and receive information from like configured devices and/or other devices such as device 800-*b* of FIG. 8B, for example.

The flexible bandwidth scaling module 845 may operate in conjunction with the receiver module 805 and transmitter module 820 to establish and communicate packet, data, and/or signaling information to other communications devices such as mobile stations and/or base stations over one or more flexible bandwidth waveforms. The receiver module 805 may be configured to receive one or more code channels and communicate packet, data, and/or signaling information received over the one or more code channels to the subframe management module 860.

The subframe management module 860 may process received packet, data, and/or signaling information to support voice communications over the one or more flexible bandwidth waveforms. The subframe management module 860 may be configured to process subframes of voice frames for encoding and decoding in conjunction with vocoder module 810 and voice decoder module 850. For example, vocoder module 810 may encode voice samples into frames of encoded and interleaved voice data including K subframes per frame for full rate voice data. Subframe management module 860 may operate with transmitter module 820 to transmit K' subframes per frame period based on a termination target of a flexible bandwidth code channel. For example, for a flexible bandwidth waveform with a scaling factor of 4/3 as illustrated in FIG. 5B, the termination target may be 12 subframes. In this example, transmitter module 820 may transmit 12 subframes per frame period, dilated by the flexible bandwidth waveform to occupy substantially all of the frame period. Subframe management module 860 may also operate with receiver module 805 and voice decoder module 850 to receive the 12 subframes and attempt frame decode based on the received subframes. In embodiments, the frame decode attempt occurs at the end of a normal frame period based on the subset of subframes received during the frame period.

Figure 8B:
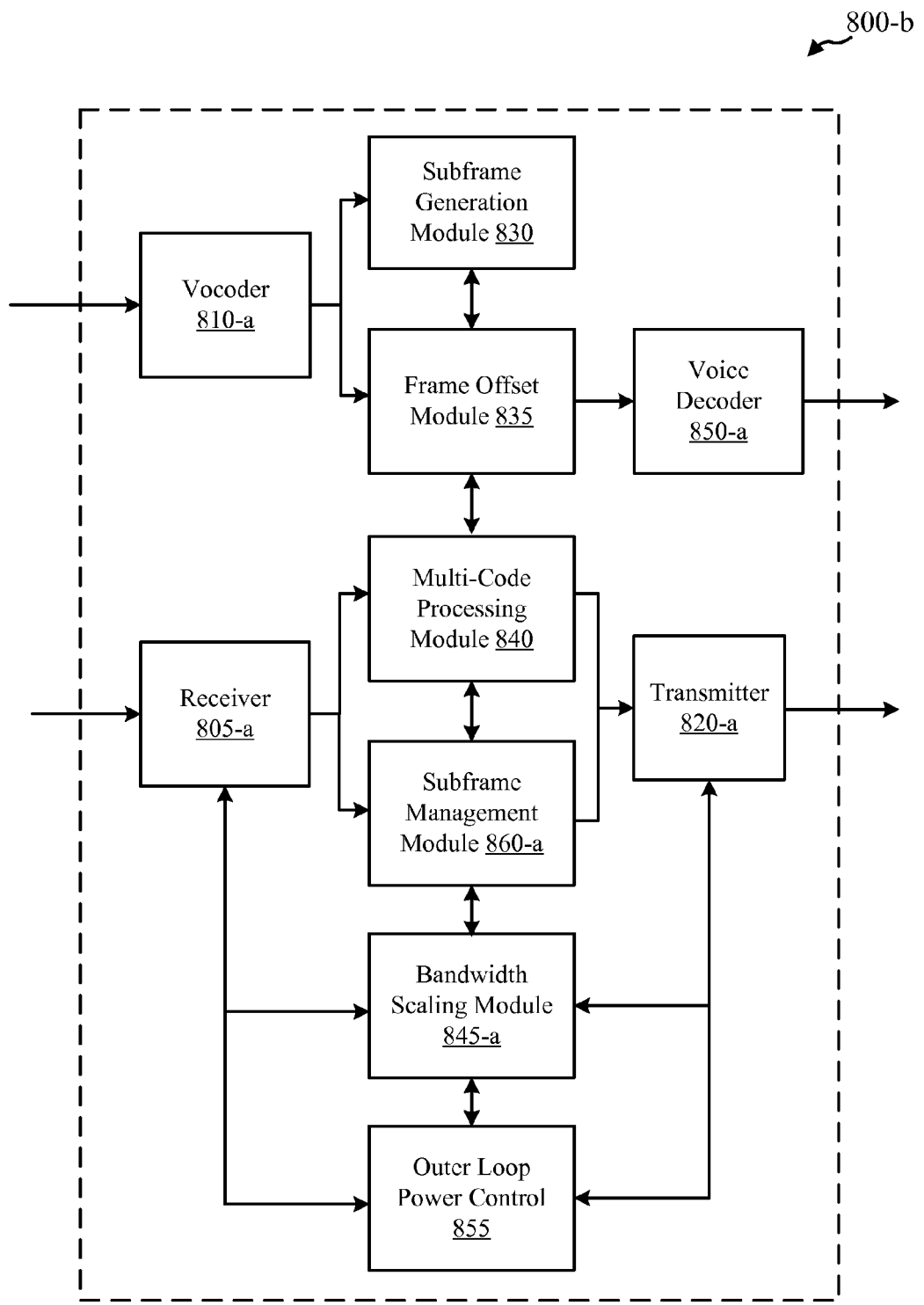
FIG. 8B shows a block diagram of a device configured to support voice communications using flexible bandwidth waveforms in accordance with various embodiments.

Turning next to FIG. 8B, a block diagram illustrates a device 800-*b* that may be employed to support voice communication over multiple code channels using a subset of subframes of voice frames in accordance with various embodiments. The device 800-*b* may be an example of one or more aspects of base stations 105 and/or mobile devices 115 described with reference to FIG. 1, FIG. 2, FIG. 3, FIG. 9, FIG. 10, and/or FIG. 11. The device 800-*b* may also be a processor. The device 800-*b* may include a receiver module 805-*a*, a vocoder module 810-*a*, a transmitter module 820-*a*, a subframe generation module 830, a frame offset module 835, a multi-code processing module 840, a bandwidth scaling module 845-*a*, a voice decoder module 850-*a*, an outer loop power control module 855, and/or a subframe management module 860-*a*. Each of these components may be in communication with each other. Device 800-*b* and/or its components may be configured to transmit and receive information from like configured devices and/or other devices such as device 800-*a* of FIG. 8A, for example.

The device 800-*b* may be used to support voice over multiple flexible bandwidth waveforms using aspects of transmission and reception of subsets of subframes of voice data and multiple code channels as described above. In embodiments subframes of voice frames may be reordered over multiple code channels and transmitted in parallel or using an offset between code channels. For example, voice samples may be encoded by vocoder module 810-*a* into voice frames. The voice frames may be split into subframes by subframe generation module 830 and/or offset by frame offset module 835 based on a number of code channels determined by multi-code processing module 840 and a termination target determined by subframe management module 860-*a*. Multi-code processing module 840 may control transmitter module 820-*a* to transmit the reordered subframes over the multiple code channels. Outer loop power control module 855 may set outer loop power control set-points for the multiple flexible bandwidth code channels such that the transmitted number of subframes provide a predetermined frame error rate.

The device 800-*b* may be employed as a receiver for supporting voice over multiple flexible bandwidth code channels. The device 800-*b* may receive the transmitted subframes over the multiple code channels and attempt frame decode based on the received subframes, which may be fewer subframes than the number of subframes encoded in a full rate voice frame.

Components of devices 700-*a*, 700-*b*, 800-*a*, and/or 800-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 9:
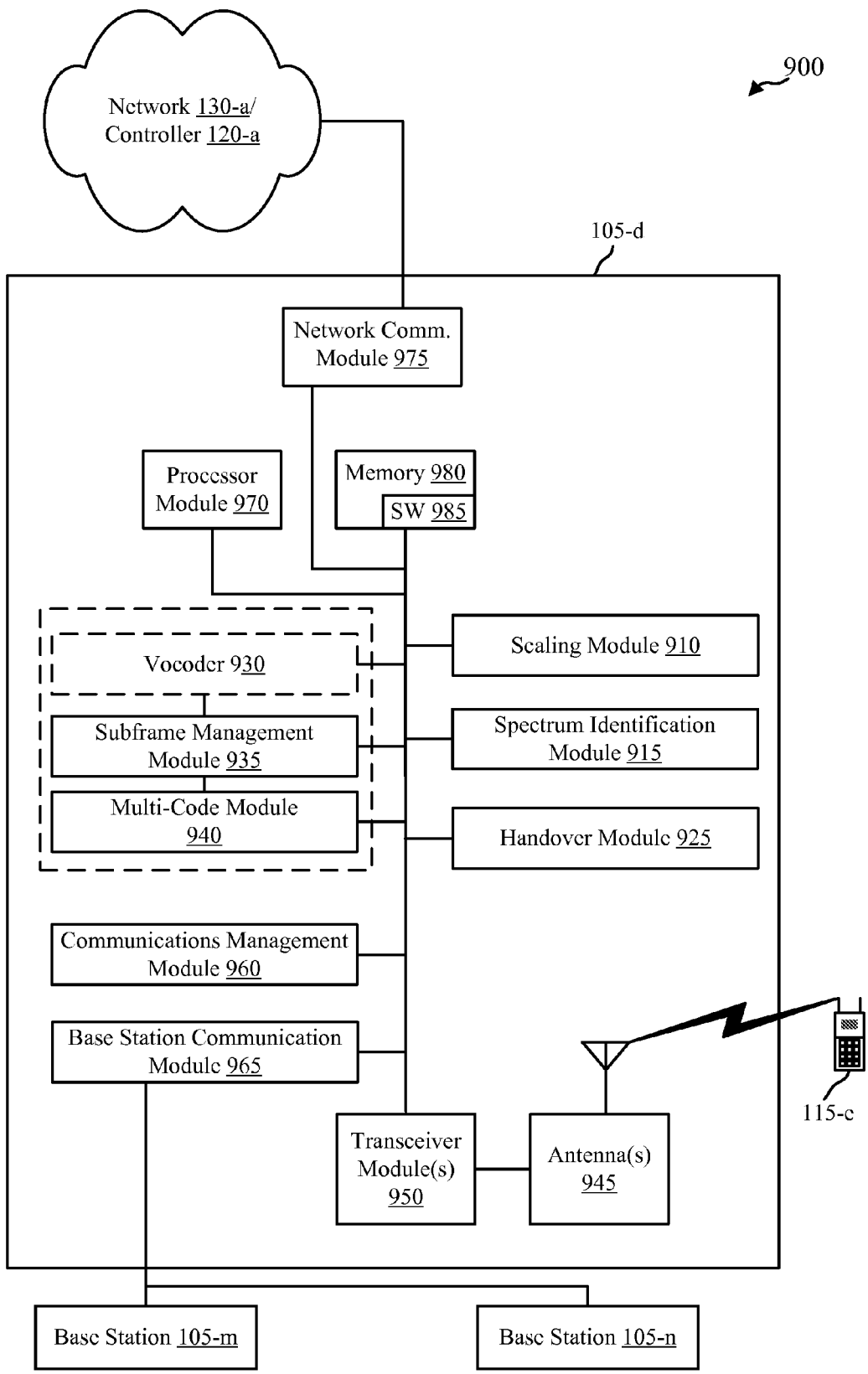
FIG. 9 shows a block diagram of a wireless communications system in accordance with various embodiments.

FIG. 9 shows a block diagram of a communications system 900 that may be configured for supporting voice communication in accordance with various embodiments. This system 900 may be an example of aspects of the system 100 depicted in FIG. 1, system 200 of FIG. 2, system 300 of FIG. 3, and/or device 700-*a*, 700-*b*, 800-*a*, and/or 800-*b* of FIGS. 7A, 7B, 8A, and/or 8B. The base station 105-*d* may include antenna(s) 945, a transceiver module 950, memory 980, and a processor module 970, which each may be in communication, directly or indirectly, with each other (e.g., over one or more buses). The transceiver module 950 may be configured to communicate bi-directionally, via the antenna(s) 945, with the mobile device 115-*e*, which may be a multi-mode mobile device. The transceiver module 950 (and/or other components of the base station 105-*d*) may also be configured to communicate bi-directionally with one or more networks. In some cases, the base station 105-*d* may communicate with the core network 130-*a* and/or controller 120-*a* through network communications module 975. Base station 105-*d* may be an example of an eNodeB base station, a Home eNodeB base station, a NodeB base station, and/or a Home NodeB base station. Controller 120-*a* may be integrated into base station 105-*d* in some cases, such as with an eNodeB base station.

Base station 105-*d* may also communicate with other base stations 105, such as base station 105-*m* and base station 105-*n*. Each of the base stations 105 may communicate with mobile device 115-*e* using different wireless communications technologies, such as different Radio Access Technologies. In some cases, base station 105-*d* may communicate with other base stations such as 105-*m* and/or 105-*n* utilizing base station communication module 965. In some embodiments, base station communication module 965 may provide an X2 interface within an LTE wireless communication technology to provide communication between some of the base stations 105. In some embodiments, base station 105-*d* may communicate with other base stations through controller 120-*a* and/or core network 130-*a*.

The memory 980 may include random access memory (RAM) and read-only memory (ROM). The memory 980 may also store computer-readable, computer-executable software code 985 containing instructions that are configured to, when executed, cause the processor module 970 to perform various functions described herein (e.g., call processing, database management, message routing, etc.). Alternatively, the software code 985 may not be directly executable by the processor module 970 but be configured to cause the computer, e.g., when compiled and executed, to perform functions described herein.

The processor module 970 may include an intelligent hardware device, e.g., a central processing unit (CPU) such as those made by Intel® Corporation or AMD®, a microcontroller, an application-specific integrated circuit (ASIC), etc. The processor module 970 may include a speech encoder (not shown) configured to receive audio via a microphone, convert the audio into packets (e.g., 30 ms in length, etc.) representative of the received audio, provide the audio packets to the transceiver module 650, and provide indications of whether a user is speaking. Alternatively, an encoder may only provide packets to the transceiver module 650, with the provision or withholding/suppression of the packet itself providing the indication of whether a user is speaking.

The transceiver module 950 may include a modem configured to modulate the packets and provide the modulated packets to the antenna(s) 945 for transmission, and to demodulate packets received from the antenna(s) 945. While some examples of the base station 105-*d* may include a single antenna 945, the base station 105-*d* preferably includes multiple antennas 945 for multiple links which may support carrier aggregation. For example, one or more links may be used to support macro communications with mobile device 115-*e*.

According to the architecture of FIG. 9, the base station 105-*d* may further include a communications management module 960. The communications management module 960 may manage communications with other base stations 105. By way of example, the communications management module 960 may be a component of the base station 105-*d* in communication with some or all of the other components of the base station 105-*d* via a bus. Alternatively, functionality of the communications management module 960 may be implemented as a component of the transceiver module 950, as a computer program product, and/or as one or more controller elements of the processor module 970.

The components for base station 105-*d* may be configured to implement aspects discussed above with respect to devices 700-*a*, 700-*b*, 800-*a*, and/or 800-*b* of FIGS. 7A, 7B, 8A, and/or 8B and may not be repeated here for the sake of brevity. For example, the vocoder module 930 may include similar functionality as the vocoder module 710 or 810 of FIGS. 7A, 7B, 8A and/or 8B. In some embodiments, the functionality of vocoder module 930 is performed by processor module 970 instead of in a separate vocoder module 930 as illustrated in FIG. 9. The multi-code module 940 may include similar functionality as code channel control module 715, subframe generation module 730, frame offset module 735, multi-code processing module 740, and/or voice decoder 750 of FIG. 7A and/or FIG. 7B. The subframe management module 935 may include similar functionality as the vocoder module 810, subframe management module 860, voice decoder module 850, and/or outer loop power control module 855 of FIGS. 8A and/or 8B.

The base station 105-*d* may also include a spectrum identification module 915. The spectrum identification module 915 may be utilized to identify spectrum available for flexible waveforms. In some embodiments, a handover module 925 may be utilized to perform handover procedures of the mobile device 115-*e* from one base station 105 to another. For example, the handover module 925 may perform a handover procedure of the mobile device 115-*e* from base station 105-*d* to another where normal waveforms are utilized between the mobile device 115-*e* and one of the base stations and flexible waveforms are utilized between the mobile device and another base station. A scaling module 910 may be utilized to scale and/or alter chip rates to generate flexible waveforms. Scaling module 910 may implement some or all of the functionality of bandwidth scaling modules 745 and/or 845 illustrated in FIGS. 7B, 8A, and/or 8B.

In some embodiments, the transceiver module 950 in conjunction with antenna(s) 945, along with other possible components of base station 105-*d*, may transmit information regarding flexible waveforms and/or scaling factors from the base station 105-*d* to the mobile device 115-*e*, to other base stations 105-*m*/105-*n*, or core network 130-*a*. In some embodiments, the transceiver module 950 in conjunction with antenna(s) 945, along with other possible components of base station 105-*d*, may transmit information to the mobile device 115-*e*, to other base stations 105-*m*/105-*n*, or core network 130-*a*, such as flexible waveforms and/or scaling factors, such that these devices or systems may utilize flexible waveforms.

Figure 10:
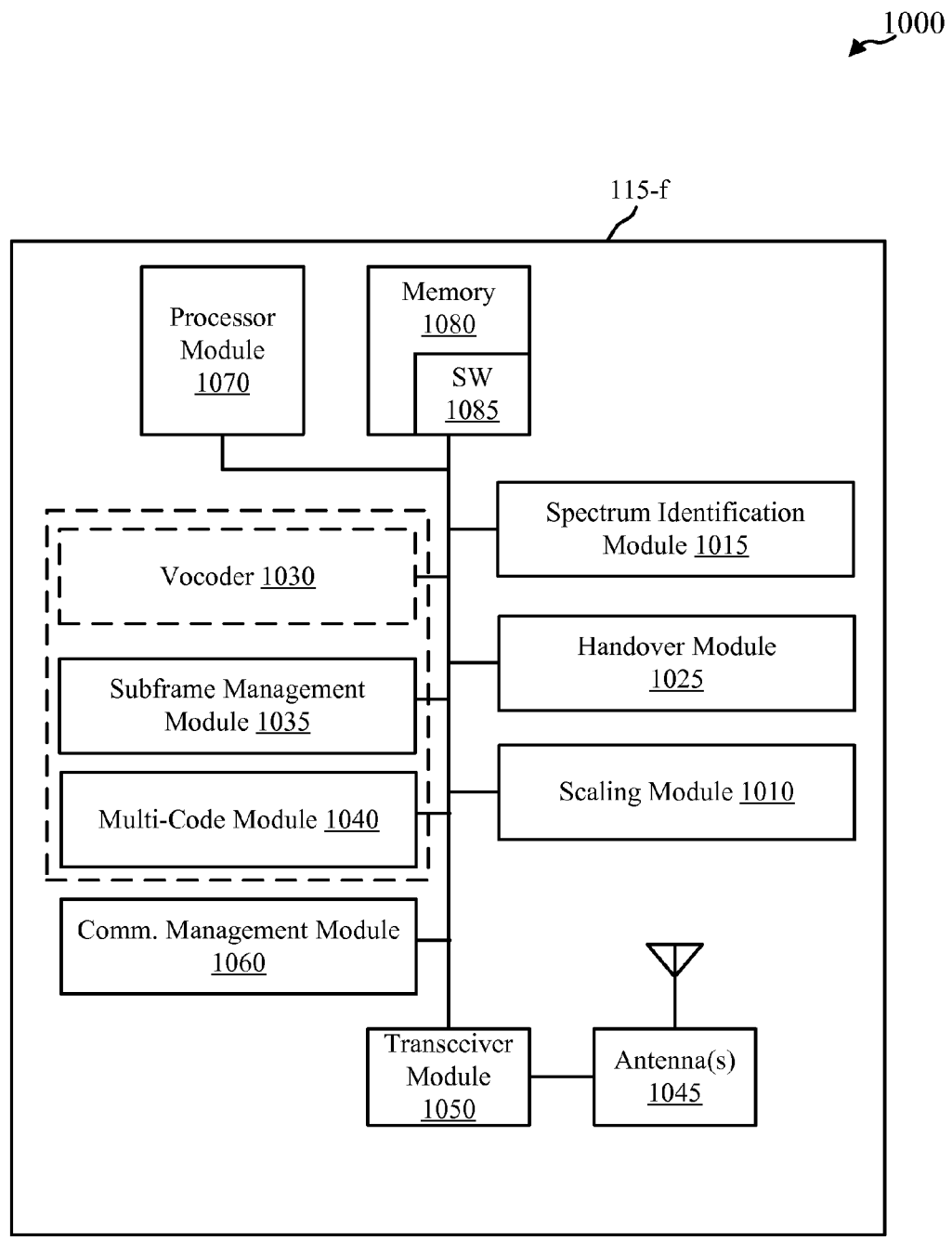
FIG. 10 shows a block diagram of a mobile device in accordance with various embodiments.

FIG. 10 is a block diagram 1000 of a mobile device 115-*f* configured for supporting voice communication in accordance with various embodiments. The mobile device 115-*f* may have any of various configurations, such as personal computers (e.g., laptop computers, netbook computers, tablet computers, etc.), cellular telephones, PDAs, smartphones, digital video recorders (DVRs), internet appliances, gaming consoles, e-readers, etc. The mobile device 115-*f* may have an internal power supply (not shown), such as a small battery, to facilitate mobile operation. In some embodiments, the mobile device 115-*f* may be the mobile device 115 of FIG. 1, FIG. 2 and/or FIG. 3. The mobile device 115-*f* may include aspects of aspects of devices 700-*a*, 700-*b*, 800-*a*, and/or 800-*b* of FIGS. 7A, 7B, 8A, and/or 8B. The mobile device 115-*f* may be a multi-mode mobile device. The mobile device 115-*f* may be referred to as a wireless communications device in some cases.

The mobile device 115-*f* may include a vocoder module 1030, a subframe management module 1035, a multi-code module 1040, antenna(s) 1045, a transceiver module 1050, memory 1080, and a processor module 1070, which each may be in communication, directly or indirectly, with each other (e.g., via one or more buses). The transceiver module 1050 is configured to communicate bi-directionally, via the antenna(s) 1045 and/or one or more wired or wireless links, with one or more networks, as described above. For example, the transceiver module 1050 may be configured to communicate bi-directionally with base stations 105 of FIG. 1, FIG. 2, FIG. 3, and/or FIG. 9. The transceiver module 1050 may include a modem configured to modulate the packets and provide the modulated packets to the antenna(s) 1045 for transmission, and to demodulate packets received from the antenna(s) 1045. While the mobile device 115-*f* may include a single antenna 1045, the mobile device 115-*f* will typically include multiple antennas 1045 for multiple links.

The memory 1080 may include random access memory (RAM) and read-only memory (ROM). The memory 1080 may store computer-readable, computer-executable software code 1085 containing instructions that are configured to, when executed, cause the processor module 1070 to perform various functions described herein (e.g., call processing, database management, message routing, etc.). Alternatively, the software code 1085 may not be directly executable by the processor module 1070 but be configured to cause the computer (e.g., when compiled and executed) to perform functions described herein.

The processor module 1070 may include an intelligent hardware device, e.g., a central processing unit (CPU) such as those made by Intel® Corporation or AMD®, a microcontroller, an application-specific integrated circuit (ASIC), etc. The processor module 1070 may include a speech encoder (not shown) configured to receive audio via a microphone, convert the audio into packets (e.g., 20 ms in length, 30 ms in length, etc.) representative of the received audio, provide the audio packets to the transceiver module 1050, and provide indications of whether a user is speaking. Alternatively, an encoder may only provide packets to the transceiver module 1050, with the provision or withholding/suppression of the packet itself providing the indication of whether a user is speaking.

According to the architecture of FIG. 10, the mobile device 115-*f* may further include a communications management module 1060. The communications management module 1060 may manage communications with other mobile devices 115. By way of example, the communications management module 1060 may be a component of the mobile device 115-*f* in communication with some or all of the other components of the mobile device 115-*f* via a bus. Alternatively, functionality of the communications management module 1060 may be implemented as a component of the transceiver module 1050, as a computer program product, and/or as one or more controller elements of the processor module 1070.

The components for mobile device 115-*f* may be configured to implement aspects discussed above with respect to devices 700-*a*, 700-*b*, 800-*a*, and/or 800-*b* of FIGS. 7A, 7B, 8A, and/or 8B and may not be repeated here for the sake of brevity. For example, the multi-code module 1040 may include similar functionality as the code channel control module 715 of FIG. 7A, the multi-code processing module 740 of FIG. 7B, and/or the multi-code processing module 840 of FIG. 8B. The subframe management module 1035 may include similar functionality as the vocoder module 810, subframe management module 860, voice decoder module 850, and/or outer loop power control module 855 of FIGS. 8A and/or 8B.

The mobile device 115-*f* may also include a spectrum identification module 1015. The spectrum identification module 1015 may be utilized to identify spectrum available for flexible waveforms. In some embodiments, a handover module 1025 may be utilized to perform handover procedures of the mobile device 115-*f* from one base station to another.

For example, the handover module 1025 may perform a handover procedure of the mobile device 115-f from one base station to another where normal waveforms are utilized between the mobile device 115-f and one of the base stations and flexible waveforms are utilized between the mobile device and another base station. A scaling module 1010 may be utilized to scale and/or alter chip rates to generate flexible waveforms. Scaling module 1010 may implement some or all of the functionality of bandwidth scaling modules 745 and/or 845 illustrated in FIGS. 7B, 8A, and/or 8B.

In some embodiments, the transceiver module 1050 in conjunction with antenna(s) 1045, along with other possible components of mobile device 115-f, may transmit information regarding flexible waveforms and/or scaling factors from the mobile device 115-f to base stations or a core network. In some embodiments, the transceiver module 1050, in conjunction with antennas 1045 along with other possible components of mobile device 115-f, may transmit information, such as flexible waveforms and/or scaling factors, to base stations or a core network such that these devices or systems may utilize flexible waveforms.

Figure 11:
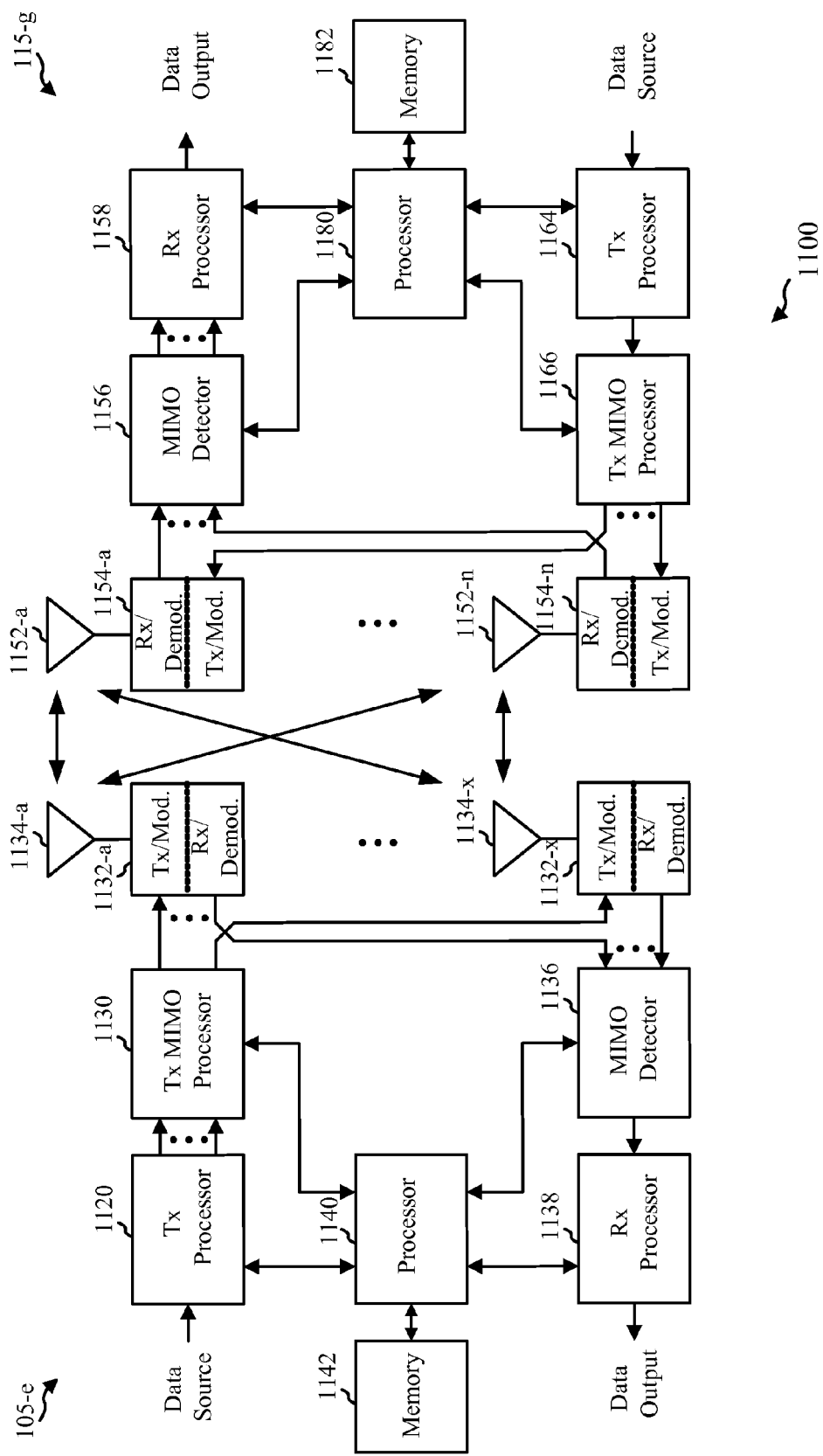
FIG. 11 shows a block diagram of a wireless communications system that includes a base station and a mobile device in accordance with various embodiments.

FIG. 11 is a block diagram of a system 1100 including a base station 105-e and a mobile device 115-g in accordance with various embodiments. This system 1100 may be an example of the system 100 of FIG. 1, systems 200 of FIG. 2, system 300 of FIG. 3, and/or system 900 of FIG. 9. The base station 105-e may be equipped with antennas 1134-a through 1134-x, and the mobile device 115-g may be equipped with antennas 1152-a through 1152-n. At the base station 105-e, a transmit processor 1120 may receive data from a data source.

The transmitter processor 1120 may process the data. The transmitter processor 1120 may also generate reference symbols, and a cell-specific reference signal. A transmit (TX) MIMO processor 1130 may perform spatial processing (e.g., precoding) on data symbols, control symbols, and/or reference symbols, if applicable, and may provide output symbol streams to the transmit modulators 1132-a through 1132-x. Each modulator 1132 may process a respective output symbol stream (e.g., for OFDM, etc.) to obtain an output sample stream. Each modulator 1132 may further process (e.g., convert to analog, amplify, filter, and upconvert) the output sample stream to obtain a downlink (DL) signal. In one example, DL signals from modulators 1132-a through 1132-x may be transmitted via the antennas 1134-a through 1134-x, respectively. The transmitter processor 1120 may receive information from a processor 1140. The processor 1140 may be configured to generate voice frames and process the voice frames in accordance with the multi-code and transmission of a subset of subframes embodiments described above. In some embodiments, the processor 1140 may be implemented as part of a general processor, the transmitter processor 1120, and/or the receiver processor 1138. A memory 1142 may be coupled with the processor 1140.

In some embodiments, the processor 1140 is configured to support voice communications using multiple code channels and/or transmission of a subset of subframes techniques as described above. The multi-code and transmission of a subset of subframes techniques may be used to support voice communication between base stations 105-d and mobile devices 115-g. Such voice communications may utilize normal bandwidth waveforms and/or flexible bandwidth waveforms. For example, processor 1140 may be configured to determine multiple code channels for transmission, generate voice frames, and transmit the voice frames over the multiple code channels in conjunction with transmitter processor 1120 and transmitter MIMO processor 1130, modulators 1132 and antennas 1134. Processor 1140 may further be configured to receive the information transmitted over the multiple code channels through MIMO detector 1136 and processor 1138, de-modulators 1132, and antennas 1134, and decode the voice frames.

The processor 1140 may further be configured to support voice communication using the described transmission of a subset of subframes techniques. In embodiments, processor 1140 may determine a termination target based on a scaling factor of one or more code channels that employ flexible bandwidth waveforms. For example, the termination target may define a number of subframes to be transmitted over the one or more code channels within a period of time corresponding to a voice frame of a normal system. The processor 1140 may transmit a subset of subframes based on the termination target of an encoded voice frame over the one or more code channels through processors 1120 and 1130, modulators 1132, and antennas 1134. The processor 1140 may receive the subset of subframes of the voice frame through MIMO detector 1136 and receiver processor 1138, de-modulators 1132, and antennas 1134, and attempt decode of the voice frame based on the subset of the subframes. Outer loop power control may be adjusted to the one or more code channels to provide a predetermined frame error rate at the termination target.

At the mobile device 115-g, the mobile device antennas 1152-a through 1152-n may receive the DL signals from the base station 105-e and may provide the received signals to the demodulators 1154-a through 1154-n, respectively. Each demodulator 1154 may condition (e.g., filter, amplify, down-convert, and digitize) a respective received signal to obtain input samples. Each demodulator 1154 may further process the input samples (e.g., for OFDM, etc.) to obtain received symbols. A MIMO detector 1156 may obtain received symbols from all the demodulators 1154-a through 1154-n, perform MIMO detection on the received symbols if applicable, and provide detected symbols. A receiver processor 1158 may process (e.g., demodulate, deinterleave, and decode) the detected symbols, providing decoded data for the mobile device 115-g to a data output, and provide decoded control information to a processor 1180, or memory 1182.

On the uplink (UL), at the mobile device 115-g, a transmitter processor 1164 may receive and process data from a data source. The transmitter processor 1164 may also generate reference symbols for a reference signal. The symbols from the transmitter processor 1164 may be precoded by a transmit MIMO processor 1166 if applicable, further processed by the demodulators 1154-a through 1154-n (e.g., for SC-FDMA, etc.), and be transmitted to the base station 105-e in accordance with the transmission parameters received from the base station 105-e. The transmitter processor 1164 may be configured to generate voice frames and process the voice frames in accordance with the multi-code and transmission of a subset of subframes embodiments described above. The processor 1180 may invert the effects of time stretching associated with the use of flexible bandwidth through parameter scaling. At the base station 105-e, the UL signals from the mobile device 115-g may be received by the antennas 1134, processed by the demodulators 1132, detected by a MIMO detector 1136 if applicable, and further processed by a receive processor. The receive processor 1138 may provide decoded data to a data output and to the processor 1180. In some embodiments, the processor 1180 may be implemented as part of a general processor, the transmitter processor 1164, and/or the receiver processor 1158.

In some embodiments, the processor 1180 is configured to support voice communications using multiple code channels and/or transmission of a subset of subframes as described above. The multi-code and transmission of a subset of subframes may be used to support voice communication between base stations 105-*d* and mobile devices 115-*g*. Such voice communications may utilize normal bandwidth waveforms and/or flexible bandwidth waveforms. For example, processor 1180 may be configured to determine multiple code channels for transmission, generate voice frames, and transmit the voice frames over the multiple code channels in conjunction with transmitter processor 1164 and transmitter MIMO processor 1166, modulators 1154 and antennas 1152. Processor 1180 may further be configured to receive the information transmitted over the multiple code channels through MIMO detector 1156 and receiver processor 1158, de-modulators 1154, and antennas 1152, and decode the voice frames.

The processor 1180 may further be configured to support voice communication by transmitting and/or receiving a subset of subframes within a frame period as described. In embodiments, processor 1180 may determine a termination target based on a scaling factor of one or more code channels that employ flexible bandwidth waveforms. For example, the termination target may define a number of subframes to be transmitted over the one or more code channels within a period of time corresponding to a voice frame of a normal system. The processor 1180 may transmit a subset of subframes based on the termination target of an encoded voice frame over the one or more code channels through processors 1164 and 1166, modulators 1154, and antennas 1152. The processor 1180 may receive the subset of subframes of the voice frame through MIMO detector 1156 and receiver processor 1158, de-modulators 1154, and antennas 1152, and attempt decode of the voice frame based on the subset of the subframes. Outer loop power control may be adjusted to the one or more code channels to provide a predetermined frame error rate at the termination target.

Figure 12A:
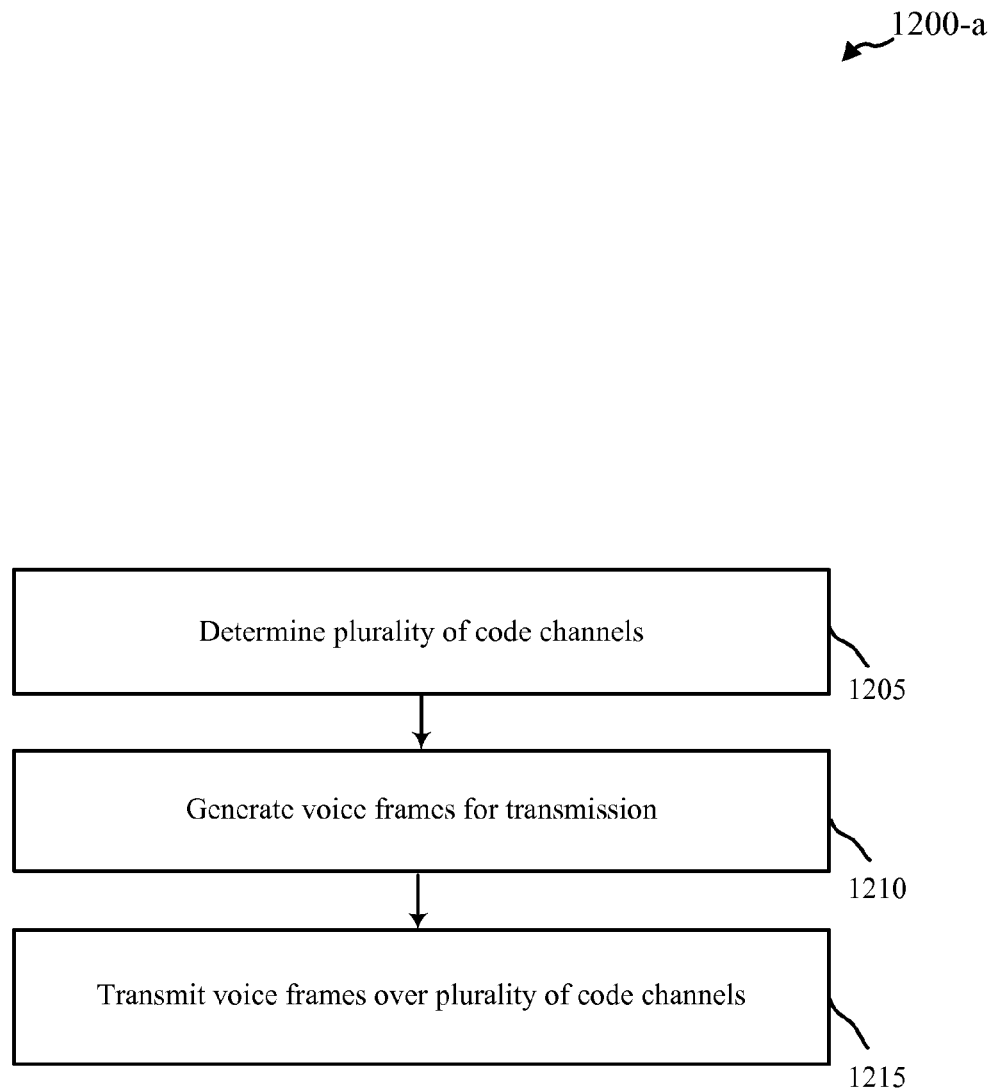
FIG. 12A shows a flow diagram of a method for supporting voice in a wireless communications system in accordance with various embodiments.

Turning to FIG. 12A, a flow diagram of a method 1200-*a* for supporting voice in a wireless communications system is illustrated in accordance with various embodiments. Method 1200-*a* may be implemented utilizing various wireless communications devices including, but not limited to: a base station 105 as seen in FIG. 1, FIG. 2, FIG. 3, FIG. 9, and/or FIG. 11; a mobile device 115 as seen in FIG. 1, FIG. 2, FIG. 3, FIG. 10, and/or FIG. 11; devices 700-*a*, 700-*b*, 800-*a*, and/or 800-*b* as seen in FIG. 7A, FIG. 7B, FIG. 8A, and/or FIG. 8B; and/or a core network 130 and/or controller 120 as seen in FIG. 1 and/or FIG. 9.

At block 1205 of method 1200-*a*, a plurality of code channels may be determined. For example, a mobile device 115 and/or a base station 105 may establish two or more code channels for transmission of a logical voice traffic channel. In some embodiments, the code channels are flexible bandwidth code channels. In some embodiments, the number of code channels is greater than a scaling factor of the flexible bandwidth code channels.

At block, 1210, voice frames are generated for transmission using the wireless communications system. For example, a vocoder or processor may be used to generate voice frames from voice samples according to a voice codec (e.g., EVRC, EVRC-B, CELP, etc.). At block 1215, the voice frames are transmitted over the plurality of code channels. For example, voice frames may be transmitted in parallel or offset using the parallel multi-code and/or multi-code with offset techniques described with reference to FIG. 4A and/or FIG. 4B.

Figure 12B:
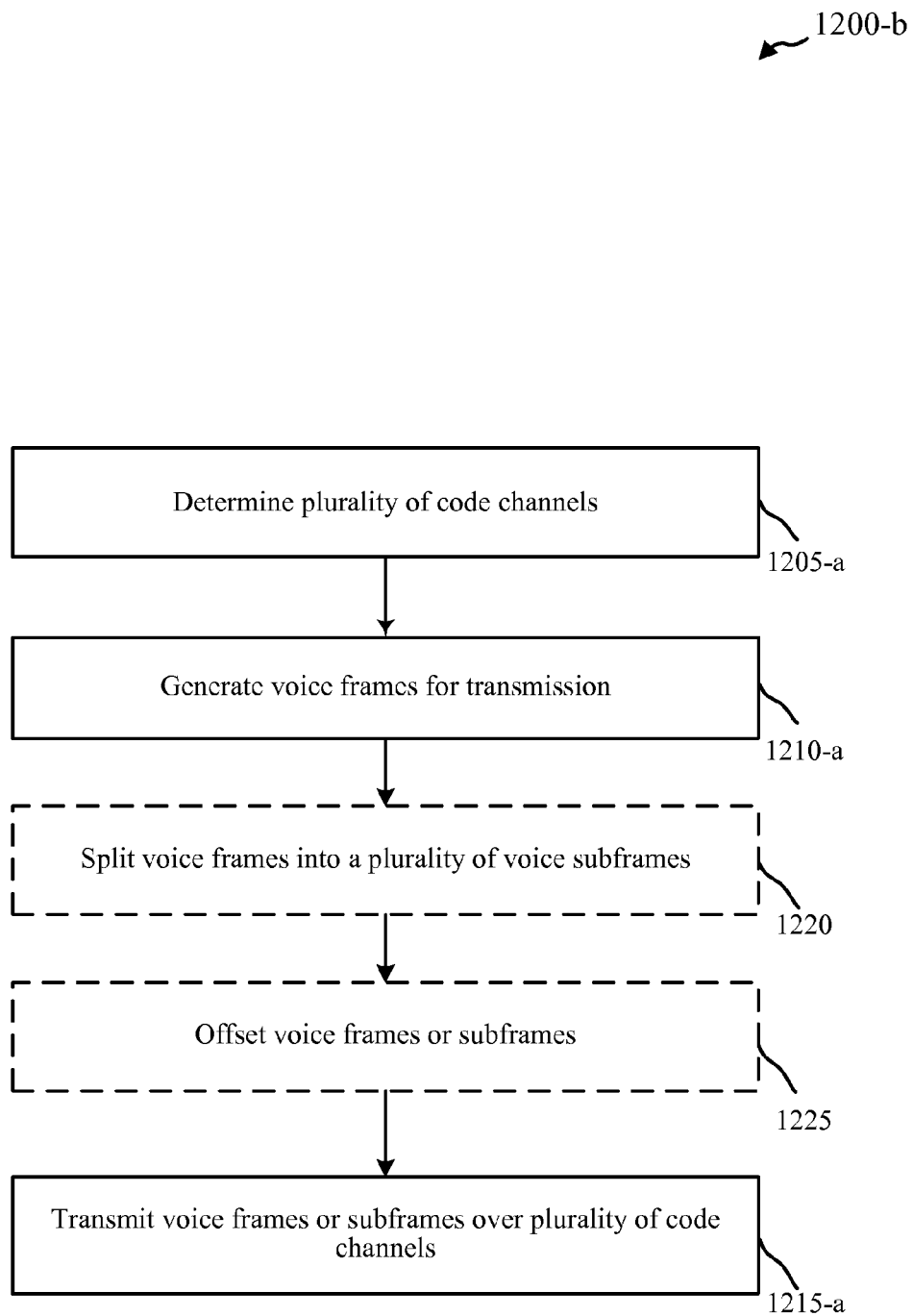
FIG. 12B shows a flow diagram of a method for supporting voice in a wireless communications system in accordance with various embodiments.

Turning to FIG. 12B, a flow diagram of a method 1200-*b* for supporting voice in a wireless communications system is illustrated in accordance with various embodiments. Method 1200-*b* may be implemented utilizing various wireless communications devices including, but not limited to: a base station 105 as seen in FIG. 1, FIG. 2, FIG. 3, FIG. 9, and/or FIG. 11; a mobile device 115 as seen in FIG. 1, FIG. 2, FIG. 3, FIG. 10, and/or FIG. 11; devices 700-*a*, 700-*b*, 800-*a*, and/or 800-*b* as seen in FIG. 7A, FIG. 7B, FIG. 8A, and/or FIG. 8B; and/or a core network 130 and/or controller 120 as seen in FIG. 1 and/or FIG. 9.

At block 1205-*a* of method 1200-*b*, a plurality of code channels may be determined. At block 1210-*a*, voice frames may be generated for transmission. In some embodiments, the voice frames are split into a plurality of voice subframes at block 1220. In some embodiments, the voice frames and/or subframes are offset for transmission over the plurality of code channels at block 1225. For example, voice frames may be offset by a frame period as illustrated in FIG. 4B. At block 1215-*a*, the voice frames or subframes may be transmitted over the plurality of code channels. For example, voice subframes may be transmitted in parallel using the parallel multi-code and/or multi-user multi-code techniques described with reference to FIG. 4C and/or FIG. 4D.

Figure 13A:
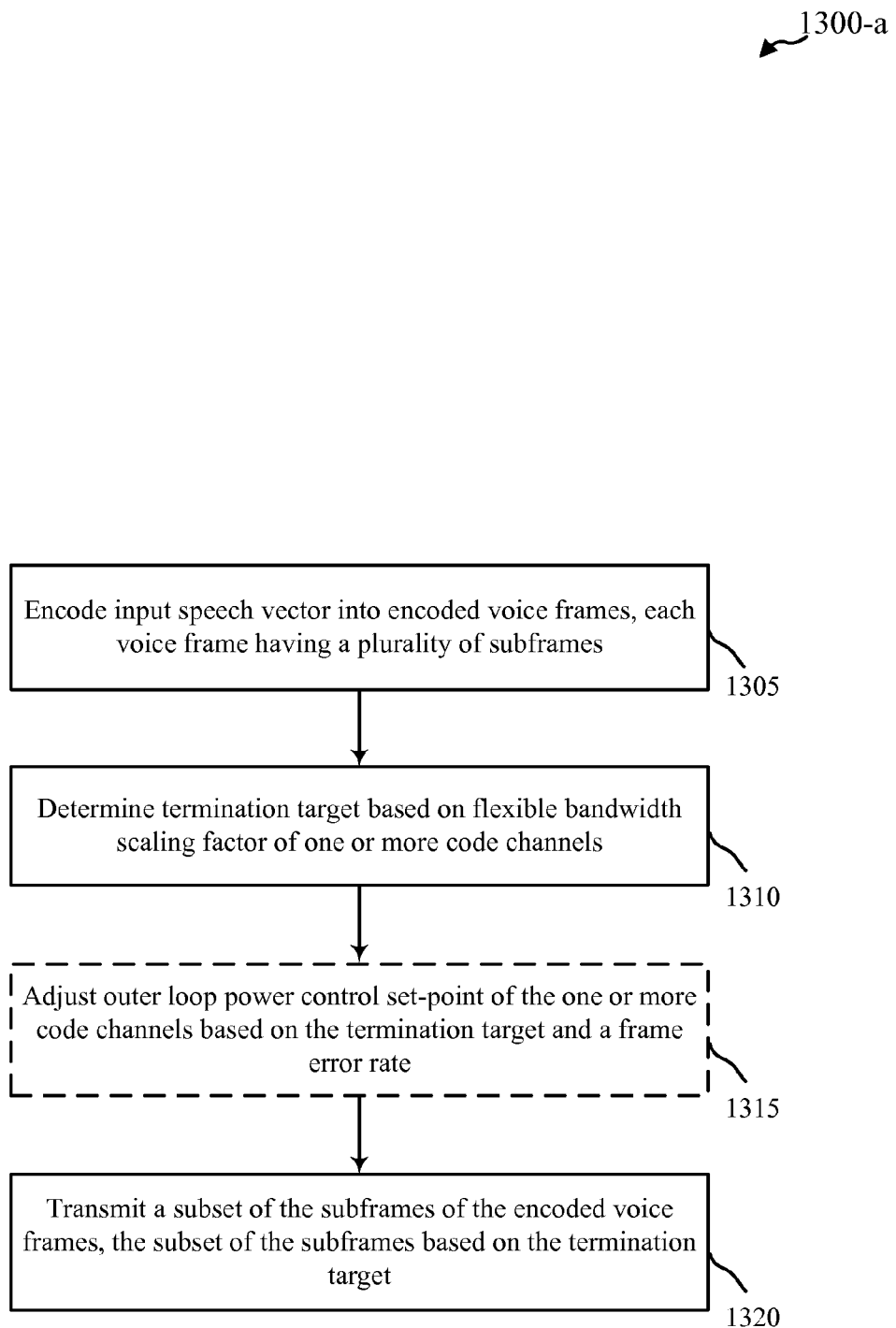
FIG. 13A shows a flow diagram of a method for supporting voice in a wireless communications system in accordance with various embodiments.

Turning to FIG. 13A, a flow diagram of a method 1300-*a* for supporting voice in a wireless communications system is illustrated in accordance with various embodiments. Method 1300-*a* may be implemented utilizing various wireless communications devices including, but not limited to: a base station 105 as seen in FIG. 1, FIG. 2, FIG. 3, FIG. 9, and/or FIG. 11; a mobile device 115 as seen in FIG. 1, FIG. 2, FIG. 3, FIG. 10, and/or FIG. 11; devices 700-*a*, 700-*b*, 800-*a*, and/or 800-*b* as seen in FIG. 7A, FIG. 7B, FIG. 8A, and/or FIG. 8B; and/or a core network 130 and/or controller 120 as seen in FIG. 1 and/or FIG. 9.

At block 1305 of method 1300-*a*, an input speech vector is encoded into a number of voice frames, where each voice frame includes a plurality of subframes. The subframes may be defined by periods of time and/or a number of bits and/or symbols to be transmitted during a period of controlled power transmission as described above. At block 1310, a termination target is determined based on a flexible bandwidth scaling factor of one or more code channels. For example, the termination target may be related to the number of subframes that can be transmitted during a voice frame period over the flexible bandwidth waveform of the one or more code channels. In some embodiments, the outer loop power control set-point of the one or more code channels is adjusted based on the termination target and a frame error rate at block 1315. For example, the outer loop power control set-point may be adjusted to provide a predetermined frame error rate at the termination target. At block 1320, a subset of the subframes is transmitted over the one or more code channels. The subset of the subframes may be based on the termination target. For example, a number of subframes corresponding to the termination target may be transmitted during the voice frame duration.

Figure 13B:
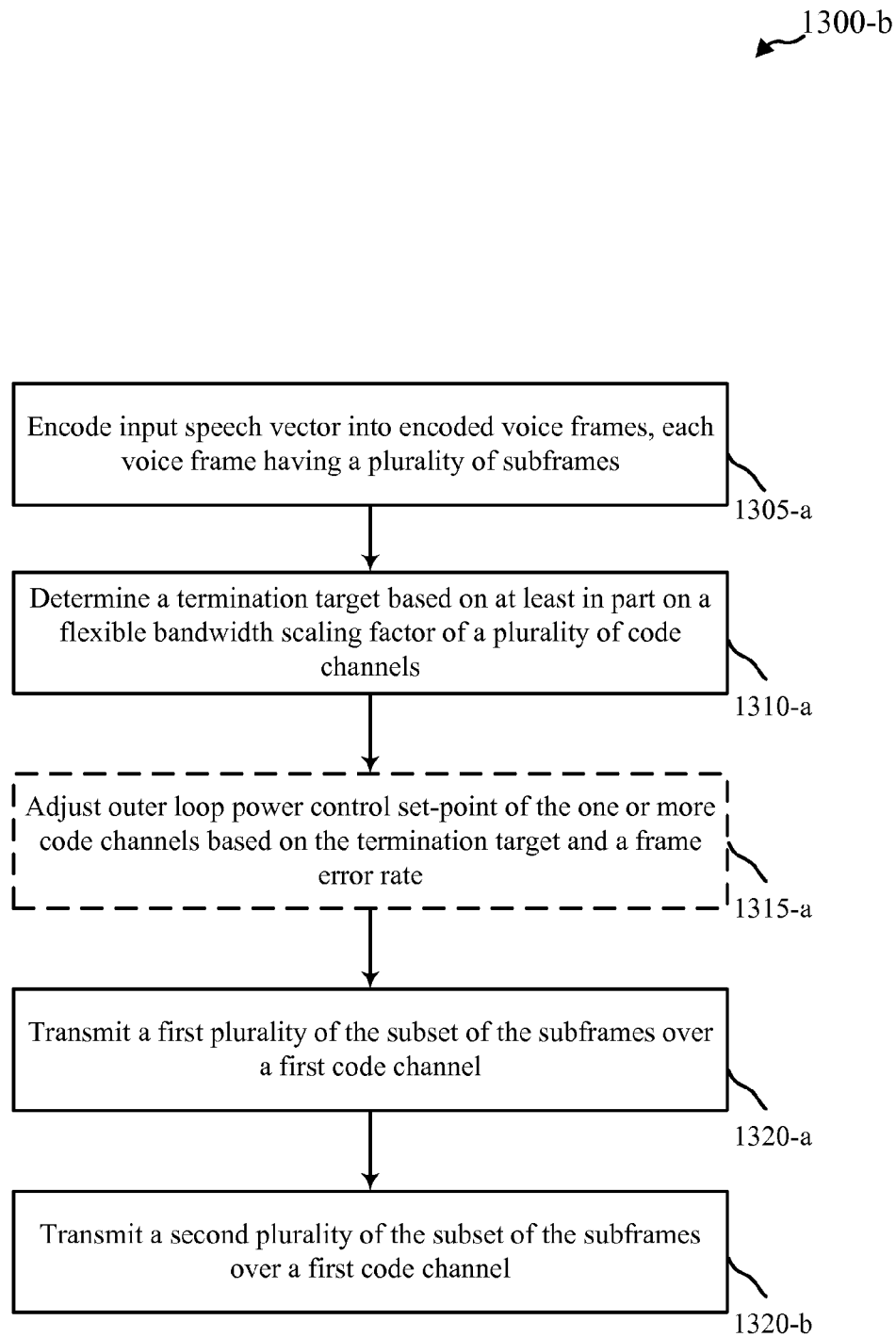
FIG. 13B shows a flow diagram of a method for supporting voice in a wireless communications system in accordance with various embodiments.

Turning to FIG. 13B, a flow diagram of a method 1300-*b* for supporting voice in a wireless communications system in accordance with various embodiments. Method 1300-*b* may be implemented utilizing various wireless communications devices including, but not limited to: a base station 105 as seen in FIG. 1, FIG. 2, FIG. 3, FIG. 9, and/or FIG. 11; a mobile device 115 as seen in FIG. 1, FIG. 2, FIG. 3, FIG. 10, and/or FIG. 11; devices 700-*a*, 700-*b*, 800-*a*, and/or 800-*b* as seen in FIG. 7A, FIG. 7B, FIG. 8A, and/or FIG. 8B; and/or a core network 130 and/or controller 120 as seen in FIG. 1 and/or FIG. 9. Method 1300-*b* may be an example of an embodiment of method 1300-*a* of FIG. 13A.

At block 1305-*a* of method 1300-*b*, an input speech vector is encoded into a number of voice frames, where each voice frame includes a plurality of subframes. At block 1310-a, a termination target is determined based at least in part on a flexible bandwidth scaling factor of a plurality of code channels. For example, the termination target may be based on the number of code channels in the plurality of code channels and the scaling factor of the flexible bandwidth waveforms of the code channels. In some embodiments, the outer loop power control set-point for the plurality of code channels is adjusted based on the termination target and a frame error rate at block 1315-a. For example, the outer loop power control set-point for the plurality of code channels may be set such that a subset of subframes, when re-ordered and transmitted over the plurality of code channels, provide a predetermined frame error rate. At block 1320-a, a first plurality of the subset of the subframes may be transmitted over a first code channel of the plurality of code channels. For example, for a multi-code system with two code channels and a termination target of 14 subframes, the first seven subframes may be transmitted over the first code channel. At block 1320-b, a second plurality of the subset of subframes may be transmitted over a second code channel of the plurality of code channels. In the example provided above, the second seven of the 14 subframes may be transmitted over the second code channel. The subframes may be assigned to code channels in any order at blocks 1320-a and 1320-b. For example, subframes 0, 2, 4, 6, 8, 10 and 12 could be transmitted over the first code channel at block 1320-a while subframes 1, 3, 5, 7, 9, 11 and 13 may be transmitted over the second code channel at block 1320-b. Other assignments of subframes to code channels will be apparent to one of skill in the art.

Figure 14A:
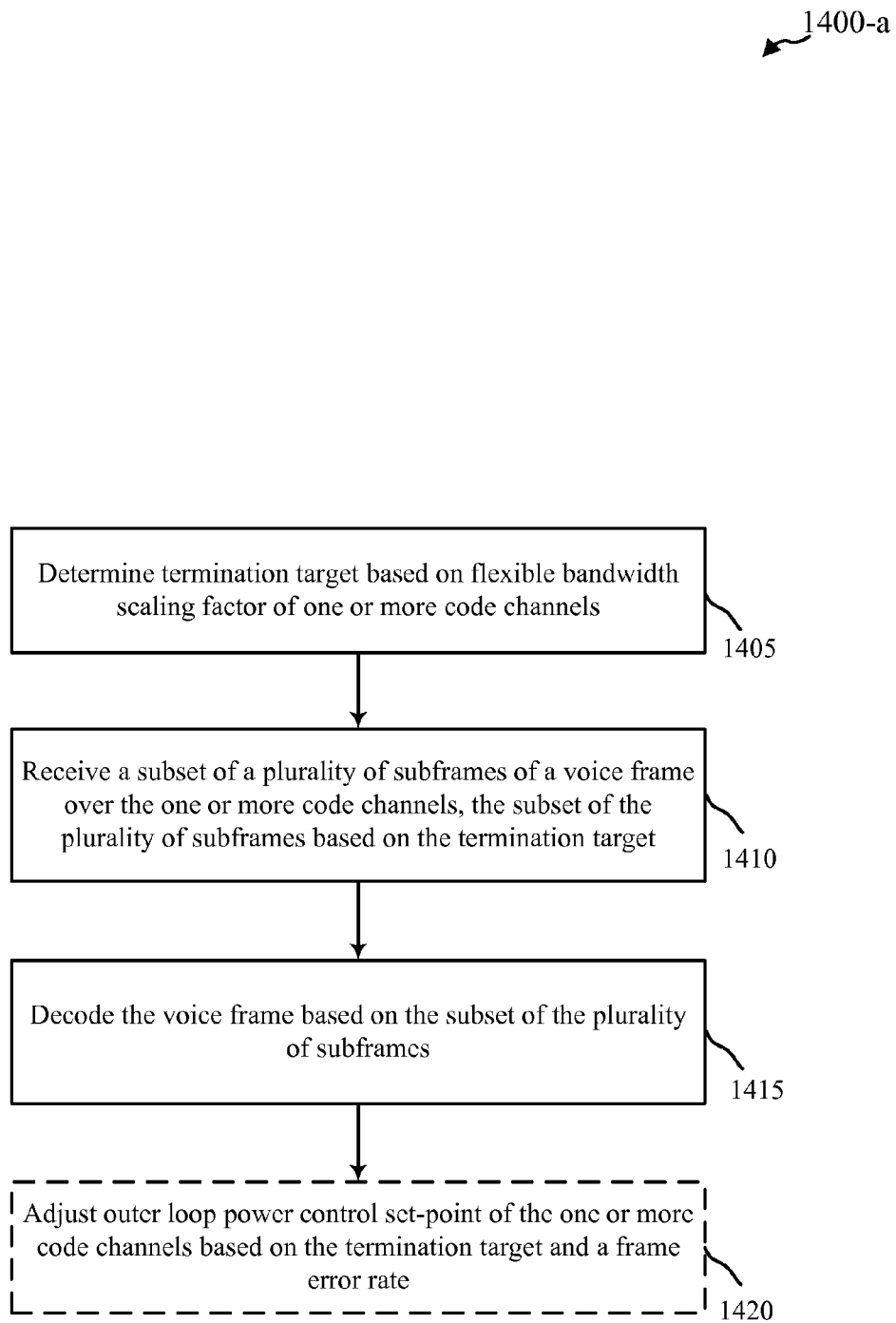
FIG. 14A shows a flow diagram of a method for supporting voice in a wireless communications system in accordance with various embodiments.

Turning to FIG. 14A, a flow diagram of a method 1400-a for supporting voice in a wireless communications system is illustrated in accordance with various embodiments. Method 1400-a may be implemented utilizing various wireless communications devices including, but not limited to: a base station 105 as seen in FIG. 1, FIG. 2, FIG. 3, FIG. 9, and/or FIG. 11; a mobile device 115 as seen in FIG. 1, FIG. 2, FIG. 3, FIG. 10, and/or FIG. 11; devices 700-a, 700-b, 800-a, and/or 800-b as seen in FIG. 7A, FIG. 7B, FIG. 8A, and/or FIG. 8B; and/or a core network 130 and/or controller 120 as seen in FIG. 1 and/or FIG. 9.

At block 1405 of method 1400-a, a termination target is determined based on a flexible bandwidth scaling factor of one or more code channels of a wireless communications system. For example, the termination target may be related to the number of subframes that can be transmitted during a voice frame period over flexible bandwidth waveforms of the one or more code channels. At block 1410, a subset of subframes of an encoded voice frame are received over the one or more code channels. In some embodiments, the subset is based on the termination target determined at block 1405. The subset of subframes for an encoded voice frame may be received over a time period that is substantially the same as the frame period. The subset may correspond to the first K' subframes of a full rate encoded voice frame having K subframes, where K' is based on the termination target. Subframes may be defined by periods of time and/or a number of bits and/or symbols to be transmitted during a period of controlled power transmission as described above.

At block 1415, decode of the voice frame may be attempted based on the received subframes. Block 1415 may be performed when the K' subframes are received, which may correspond to the end of a frame period in a normal system. In some embodiments, the outer loop power control set-point of the one or more code channels is adjusted based on the termination target and a frame error rate at block 1420. That is, the frame error rate may be monitored from the attempted decode at block 1415, and the outer-loop power control set-point may be adjusted to provide a predetermined frame error rate at the termination target.

Figure 14B:
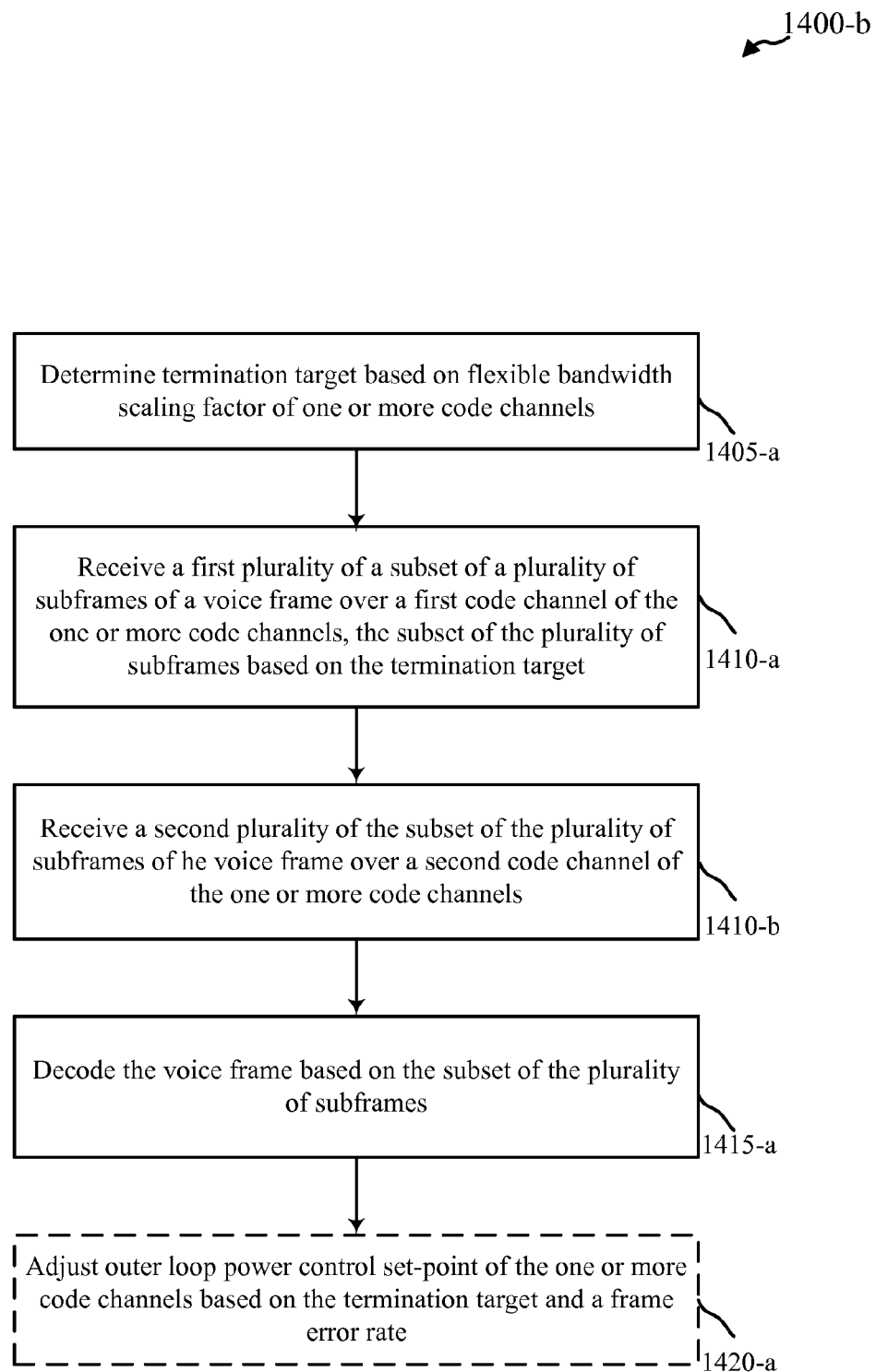
FIG. 14B shows a flow diagram of a method for supporting voice in a wireless communications system in accordance with various embodiments.

Turning to FIG. 14B, a flow diagram of a method 1400-b for supporting voice in a wireless communications system in accordance with various embodiments. Method 1400-b may be implemented utilizing various wireless communications devices including, but not limited to: a base station 105 as seen in FIG. 1, FIG. 2, FIG. 3, FIG. 9, and/or FIG. 11; a mobile device 115 as seen in FIG. 1, FIG. 2, FIG. 3, FIG. 10, and/or FIG. 11; devices 700-a, 700-b, 800-a, and/or 800-b as seen in FIG. 7A, FIG. 7B, FIG. 8A, and/or FIG. 8B; and/or a core network 130 and/or controller 120 as seen in FIG. 1 and/or FIG. 9. Method 1400-b may be an example of an embodiment of method 1400-a of FIG. 14A.

At block 1405-a of method 1400-b, a termination target is determined based on a flexible bandwidth scaling factor of one or more code channels of a wireless communications system. For example, the termination target may be related to the number of subframes that can be transmitted during a voice frame duration over flexible bandwidth waveforms of the one or more code channels.

At block 1410-a, a first plurality of a subset of subframes of an encoded voice frame may be received over a first code channel. In some embodiments, the subset is based on the termination target determined at block 1405-a. The first plurality of the subset of subframes for the encoded voice frame may be received over a time period that is substantially the same as the frame period of a normal system. The subset may correspond to the first K' subframes of a full rate encoded voice frame including K subframes, where K' is based on the termination target. Subframes may be defined by periods of time and/or a number of bits and/or symbols to be transmitted during a period of controlled power transmission as described above. At block 1410-b, a second plurality of the subset of subframes of an encoded voice frame may be received over a second code channel. For example, for a termination target of twelve subframes out of a full rate voice frame that includes sixteen subframes, six subframes (e.g., 0-5, etc.) may be received over the first code channel at block 1410-a and six subframes (e.g., 6-11, etc.) may be received over the second code channel at block 1410-b.

At block 1415-a, decode of the voice frame may be attempted based on the received subframes. Block 1415-a may be performed when the K' subframes are received, which may correspond to the end of a frame period in a normal system. In some embodiments, the outer loop power control set-point of the one or more code channels is adjusted based on the termination target and a frame error rate at block 1420-a. That is, the frame error rate may be monitored from the attempted decode at block 1415-a, and the outer-loop power control set-point may be adjusted to provide a predetermined frame error rate at the termination target.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

The invention claimed is:

1. A method for supporting voice over a wireless communications system, the method comprising:
   determining, by a wireless communication device comprising a memory and a processor, a plurality of code channels based on a scaling factor of a flexible bandwidth system;
   generating, by the wireless communication device, a plurality of voice frames for transmission;
   determining, by the wireless communication device, a termination target based on the scaling factor of the flexible bandwidth system, wherein the termination target is less than a number of subframes in the plurality of voice frames; and
   transmitting, by the wireless communication device, a subset of the subframes of the plurality of voice frames over the plurality of code channels, the subset based on the termination target.

2. The method of claim 1, further comprising:
   utilizing an offset between the plurality of code channels when transmitting the plurality of voice frames over the plurality of code channels.

3. The method of claim 1, further comprising:
   splitting one or more of the plurality of voice frames into a plurality of voice subframes, wherein transmitting the plurality of voice frames over the plurality of code channels comprises:
   transmitting the plurality of voice subframes for at least one of the plurality of voice frames over the plurality of code channels without an offset between the plurality of voice subframes.

4. The method of claim 1, wherein the plurality of code channels is greater than the scaling factor of the flexible bandwidth system.

5. The method of claim 1, wherein transmitting the plurality of voice frames over the plurality of code channels further comprises:
   transmitting a plurality of voice subframes from a plurality of users over the plurality of code channels, wherein a delay in transmission for the plurality of voice subframes is less than a delay in transmission for a normal bandwidth system.

6. The method of claim 1, wherein the plurality of code channels comprises a logical traffic channel for voice transmission via a circuit-switched network.

7. A computer program product, executed on a processor, comprising:
   a non-transitory computer-readable medium comprising:
   code for determining a plurality of code channels based on a scaling factor of a flexible bandwidth system;
   code for generating a plurality of voice frames for transmission;
   code for determining a termination target based on the scaling factor of the flexible bandwidth system, wherein the termination target is less than a number of subframes in the plurality of voice frames; and code for transmitting a subset of the subframes of the plurality of voice frames over the plurality of code channels, the subset based on the termination target.

8. The computer program product of claim 7, wherein the code for transmitting the plurality of voice frames over the plurality of code channels further comprises:

code for transmitting a plurality of voice subframes from a plurality of users over the plurality of code channels, wherein a delay in transmission for the plurality of voice subframes is less than a delay in transmission for a normal bandwidth system.

9. A wireless communications device configured for supporting voice in a wireless communications system, the wireless communications device comprising:

at least one processor configured to:

determine a plurality of code channels based on a scaling factor of a flexible bandwidth system;

generate a plurality of voice frames for transmission;

determine a termination target based on the scaling factor of the flexible bandwidth system, wherein the termination target is less than a number of subframes in the plurality of voice frames; and transmit a subset of the subframes of the plurality of voice frames over the plurality of code channels, the subset based on the termination target; and at least one memory coupled with the at least one processor.

10. The wireless communications device of claim 9, wherein the at least one processor is further configured to:

utilize an offset between the plurality of code channels when transmitting the plurality of voice frames over the plurality of code channels.

11. The wireless communications device of claim 9, wherein the at least one processor is further configured to:

split one or more of the plurality of voice frames into a plurality of voice subframes; and transmit the plurality of voice subframes for at least one of the plurality of voice frames over the plurality of code channels without an offset between the plurality of voice subframes.

12. The wireless communications device of claim 9, wherein the plurality of code channels comprise a logical traffic channel for voice transmission via a circuit-switched network.

13. The computer program product of claim 7, further comprising:

code for utilizing an offset between the plurality of code channels when transmitting the plurality of voice frames over the plurality of code channels.

14. The computer program product of claim 7, further comprising:

code for splitting one or more of the plurality of voice frames into a plurality of voice subframes, wherein transmitting the plurality of voice frames over the plurality of code channels comprises:

code for transmitting the plurality of voice subframes for at least one of the plurality of voice frames over the plurality of code channels without an offset between the plurality of voice subframes.

15. The computer program product of claim 7, wherein the plurality of code channels is greater than the sealing factor of the flexible bandwidth system.

16. The computer program product of claim 7, wherein the plurality of code channels comprises a logical traffic channel for voice transmission via a circuit-switched network.

17. The wireless communications device of claim 9, wherein the plurality of code channels is greater than the scaling factor of the flexible bandwidth system.

18. The wireless communications device of claim 9, wherein the at least one processor is further configured to:

transmit a plurality of voice subframes from a plurality of users over the plurality of code channels, wherein a delay in transmission for the plurality of voice subframes is less than a delay in transmission for a normal bandwidth system.

* * * * *